US012699540B2

(12) United States Patent
Bello et al.

(10) Patent No.: US 12,699,540 B2
(45) Date of Patent: Aug. 4, 2026

(54) SYSTEMS AND METHODS FOR REDUCING AUDIO QUALITY BASED ON ACOUSTIC ENVIRONMENT

(71) Applicant: Sonos, Inc., Goleta, CA (US)

(72) Inventors: Ryan Michael Bello, Sammamish, WA (US); Daniel Jones, London (GB); Peter Dodds, Santa Barbara, CA (US); Briet Louise Brown, Boston, MA (US); Christopher Pike, Manchester (GB)

(73) Assignee: Sonos, Inc., Goleta, CA (US)

( * ) Notice: Subject to any disclaimer, the term of this patent is extended or adjusted under 35 U.S.C. 154(b) by 302 days.

(21) Appl. No.: 18/473,811

(22) Filed: Sep. 25, 2023

(65) Prior Publication Data

US 2024/0111482 A1      Apr. 4, 2024

Related U.S. Application Data

(60) Provisional application No. 63/377,923, filed on Sep. 30, 2022.

(51) Int. Cl.
*G06F 3/16*          (2006.01)
(52) U.S. Cl.
CPC .................................... *G06F 3/165* (2013.01)
(58) Field of Classification Search
CPC ........................................................ G06F 3/165
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |

(Continued)

FOREIGN PATENT DOCUMENTS

| | | | |
|---|---|---|---|
| EP | 1389853 A1 | | 2/2004 |
| JP | 2007086281 A | * | 4/2007 |

(Continued)

OTHER PUBLICATIONS

AudioTron Quick Start Guide, Version 1.0, Mar. 2001, 24 pages.

(Continued)

*Primary Examiner* — Joseph Saunders, Jr.
(74) *Attorney, Agent, or Firm* — Fortem IP LLP

(57) ABSTRACT

The disclosed playback devices, media playback systems, and/or methods improve upon the media playback experience by selectively reducing audio quality under certain conditions. The reduction of audio quality may be based on one or more aspects of the acoustic environment, such as the number and locations of one or more users, noise levels, playback device locations relative to the acoustic environment, etc. The media playback system may monitor or periodically poll each of one or more playback devices and other devices or sensors in and around an acoustic environment to determine whether there are opportunities to reduce audio quality for one or more playback devices. This reduction in quality allows the media playback system to conserve resources in one or more aspects and, potentially, divert those resources to other aspects for purposes.

20 Claims, 20 Drawing Sheets

(56) References Cited

U.S. PATENT DOCUMENTS

| | | | |
|---|---|---|---|
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2020/0275171 | A1* | 8/2020 | Cloud ..................... H04L 65/75 |

FOREIGN PATENT DOCUMENTS

| | | | |
|---|---|---|---|
| WO | | 200153994 | 7/2001 |
| WO | 2003093950 | A2 | 11/2003 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

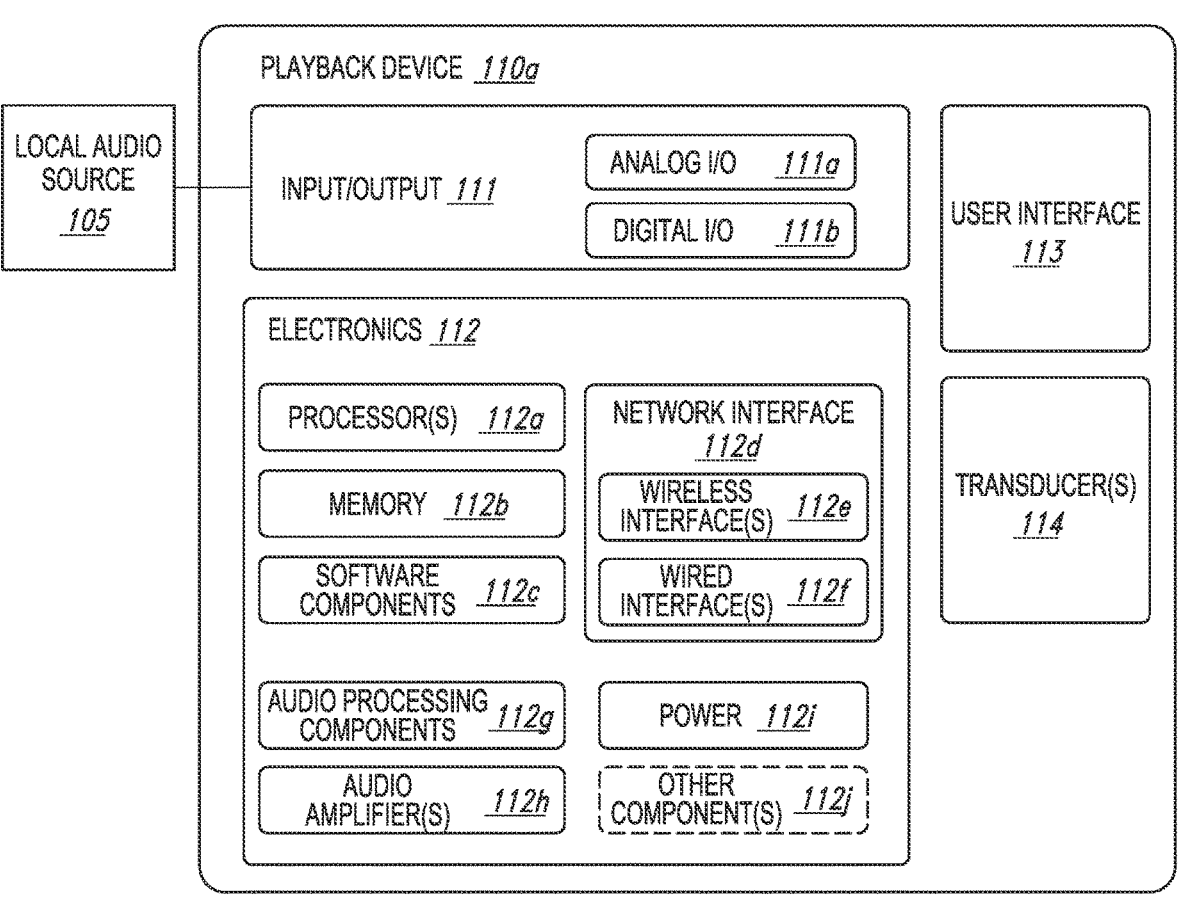
*Fig. 1C*
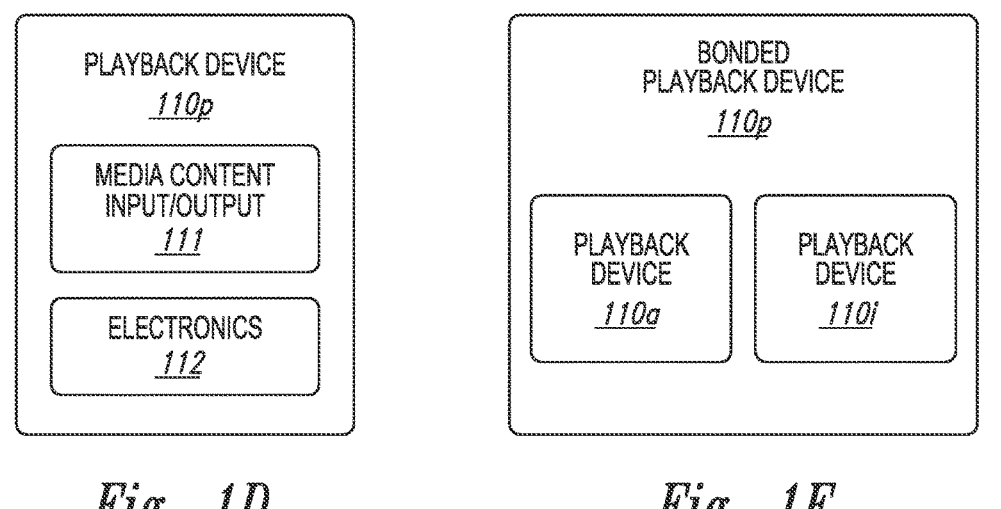
*Fig. 1D*                    *Fig. 1E*

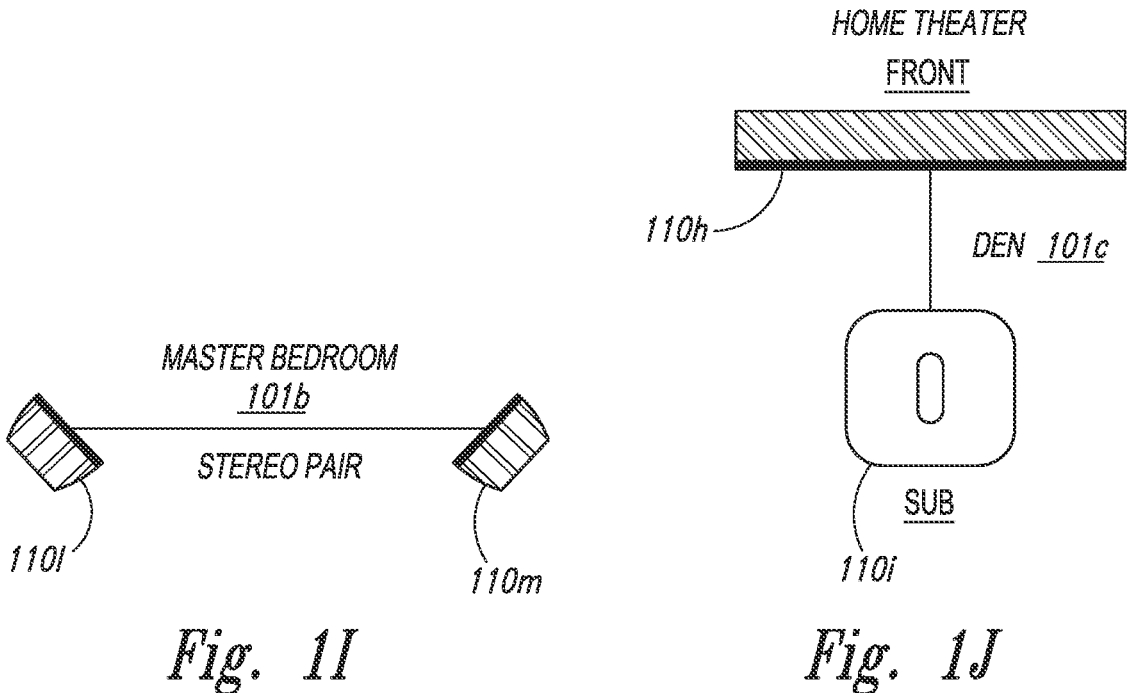
*Fig. 1I*
*Fig. 1J*
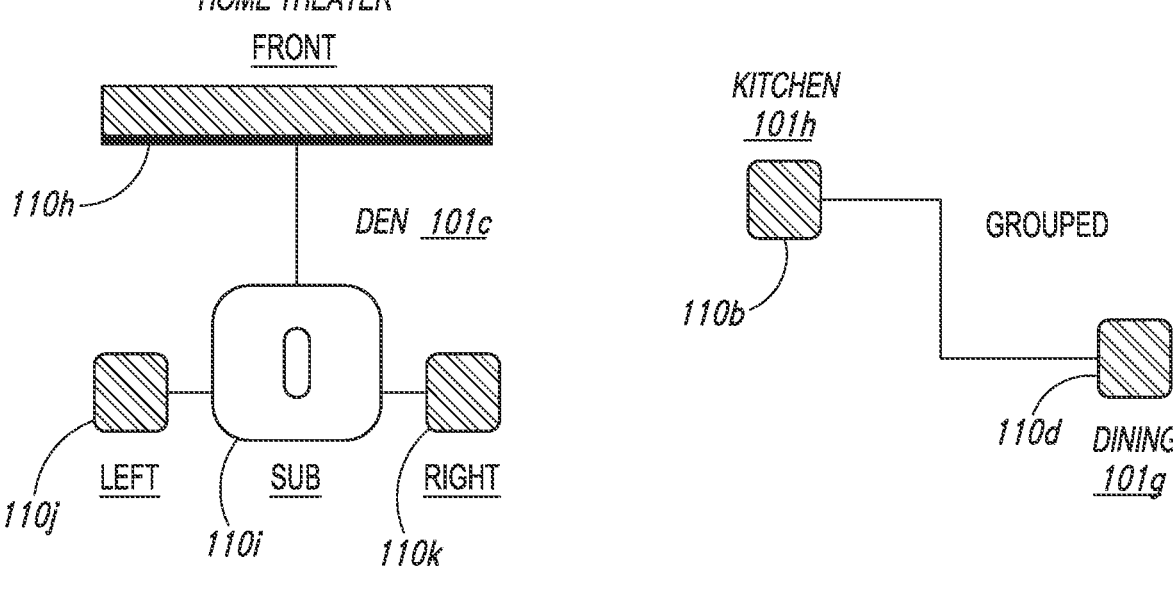
*Fig. 1K*
*Fig. 1L*

700 reduce audio quality

710 identify devices

720 analyze acoustic environment

730 analyze collected information

740 opportunity to reduce audio quality identified?

Y

750 modify playback of one or more playback devices

N

760 play audio end

SYSTEMS AND METHODS FOR REDUCING AUDIO QUALITY BASED ON ACOUSTIC ENVIRONMENT

CROSS-REFERENCE TO RELATED APPLICATION

This application claims the benefit of priority to U.S. Patent Application No. 63/377,923, filed Sep. 30, 2022, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C shows a block diagram of a playback device.

FIG. 1D shows a block diagram of a playback device.

FIG. 1E shows a block diagram of a network microphone device.

FIGS. 1I through 1L show schematic diagrams of corresponding media playback system zones.

Figure 1A:
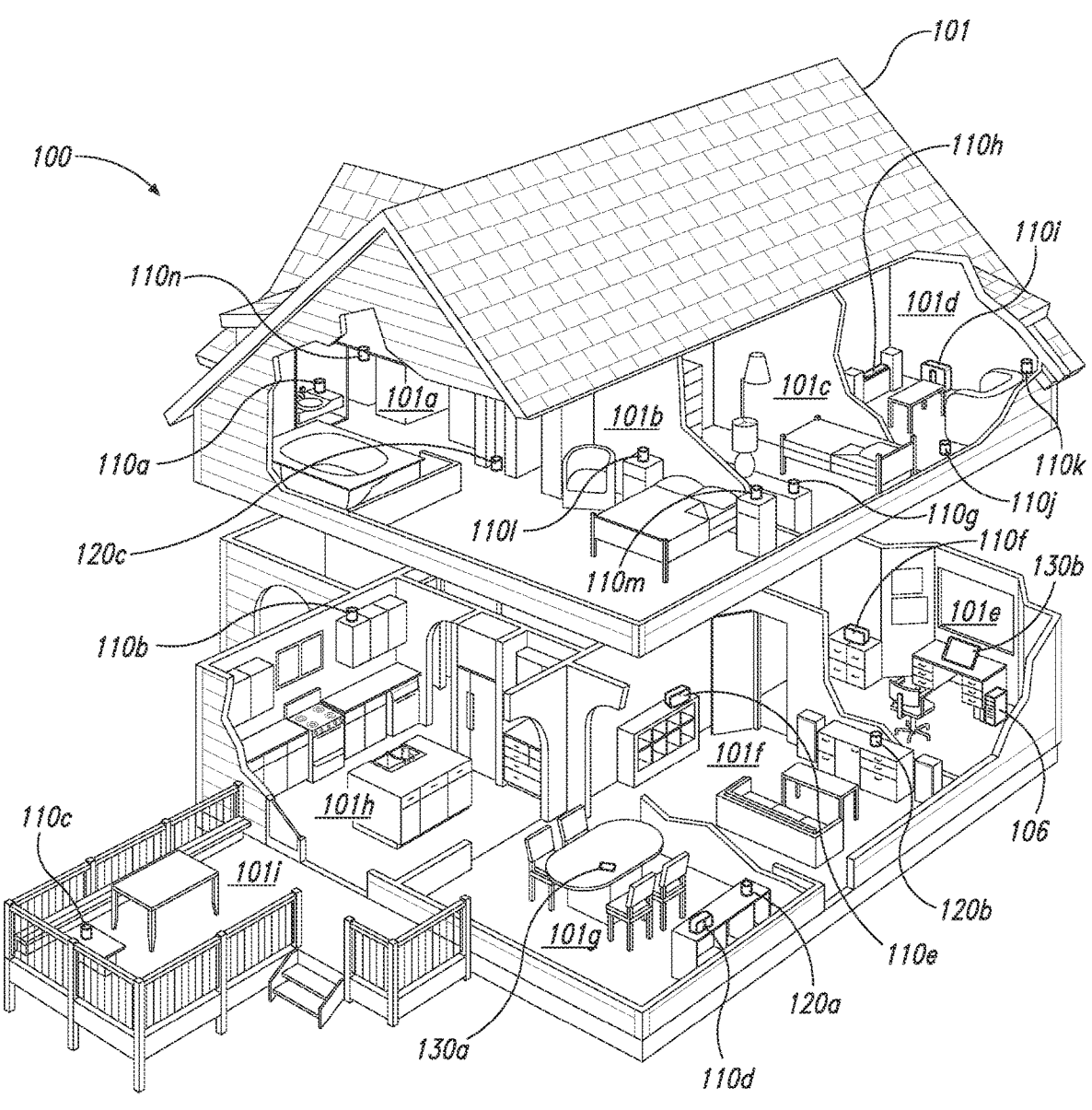
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Conventional media playback systems often include one or more playback devices, such as playback devices 110 (FIG. 1A), for streaming media. In a typical media playback system, the default preference for audio content playback is to render the highest quality version possible based on factors such as device capability, network bandwidth, power consumption, and so on. These systems typically require substantial network and power consumption, potentially leading to slower communication speeds for other devices on the same network, reduced battery performance and lifetime, etc. Accordingly, a user's overall enjoyment may be reduced if the use of these resources impact the user experience. For example, if a user is streaming a football game or movie and the video quality is reduced to provide high quality audio, the user may miss an exciting part of the game or movie. As another example, if a user is streaming music on a battery-powered playback device at an outdoor beach party the partygoers will likely enjoy the music even if it is not at the highest fidelity available. Moreover, streaming and playing the music at the highest fidelity available may require more battery power, thereby reducing the amount of time available to use the battery-powered playback device at the outdoor party. The partygoers will likely be more disappointed when music playback is no longer available than reduced audio fidelity while the music playback is available. Further, there may be scenarios where users may not be able to appreciate or enjoy the highest audio quality available because the acoustic environment renders it indiscernible from a lower quality audio stream. Accordingly, even when bandwidth and power resources are ample, there may be minimal benefit to attaining the highest quality audio stream output possible. For example, users listening to music or watching a sporting event in an otherwise loud environment (e.g., a bar, tailgate, backyard BBQ, etc.) may not be able to hear certain frequencies above the ambient noise. Additionally, they may not find any reduction in their enjoyment of the experience if those frequencies were absent because they are enjoying their company and/or surroundings. As another example, if a user turns their multichannel theater system on for background noise while moving around doing chores, the user may not need high quality audio from each or any of the speakers. Accordingly, a media playback system that reduces audio quality under particular acoustic conditions can free up resources, such as network bandwidth, power resources, etc. making them available for other purposes, without negatively impacting the overall user experience. Counterintuitively, a media playback system that opportunistically reduces audio quality under certain circumstances would have utility to its users.

The disclosed playback devices, media playback systems, and/or methods can improve upon the media playback experience by selectively reducing audio quality based on one or more aspects of the acoustic environment, such as the number and locations of one or more users, noise levels, the location of one or more playback devices relative to the acoustic environment, etc. The media playback system may periodically poll each of one or more playback devices and other devices or sensors in and around an acoustic or playback environment to determine whether there are opportunities to reduce audio quality for one or more playback devices. Additionally or alternatively, the media playback system may monitor network conditions on which it operates and poll each of the one or more playback devices for opportunities to reduce audio quality if the network conditions indicate some network congestion is present or likely. Other triggers for the media playback system to poll each of the one or more playback devices for opportunities to reduce audio quality are also possible. This reduction in quality allows the media playback system to conserve resources in one or more aspects and, potentially, divert those resources to other aspects for purposes, which can increase overall user utility and enjoyment of the media playback system.

For example, users in an acoustic environment with a lot of background or ambient noise (e.g., talking, street noise, etc.) may not be able to hear some frequencies or distinguish between different compression or quality levels over the background noise. Accordingly, a media playback system in this environment can filter out one or more of the frequencies or request content at a lower quality without substantial impact to the user enjoyment while conserving both bandwidth and power resources. As another example, a media playback system streaming audio to and coordinating playback between multiple speakers in an acoustic environment may determine that there are no users near one of the speakers or that one of the speakers is poorly placed or otherwise cannot be heard. In this case, the media playback system may disable the speaker or stop transmitting audio content to that speaker. Subsequently, the media playback system can divert resources used to coordinate playback with that speaker to other resources. Moreover, because the disabled speaker is no longer playing audio, the media playback system has conserved power resources, thereby reducing power consumption and saving money. In some cases, the media playback system conserves resources by synthesizing repetitive sounds in an acoustic signal, such as background crowd noise at a public event. For example, rather than broadcasting crowd noise, the media playback system records a snippet or loop of crowd noise, sends the snippet to playback devices to be played when crowd noise can be heard, and periodically (or based on contextual triggers) sends volume information to those playback devices so that the playback devices can play the snippet at appropriate volume levels. In this manner, the bandwidth otherwise needed to send the actual crowd noise audio becomes available for other usage(s).

In some embodiments, the media playback system configures a first playback device to play one or more content items at a first resolution. For example, the first resolution may correspond to a sampling rate of the content (e.g., 8 kHz, 44.1 kHz, 48 kHz, etc.), an audio bit depth (e.g., 8 bits/sample, 16 bits/sample, 24 bits/sample, etc.) or bitrate (128 Mbps, 192 Mbps, 320 Mbps, etc.) of the content, a number and type of audio channels included with the content (e.g., monoaural/monophonic ("mono"), stereophonic ("stereo"), 5.1, 5.x, 7.1.2, 7.2.4, 9.2.4, 9.4.6, DOLBY ATMOS®, etc.), and so on, or any combination thereof. The media playback system monitors the acoustic environment in which the first playback device (and potentially other playback devices) is playing content (i.e., the area in which a set of playback devices associated with the media playback system are positioned or can be heard). The media playback system may take advantage of any resources available to the media playback system to assess the acoustic environment. For example, media playback system may query playback devices for information about their status, current playback environment or surroundings, etc. (e.g. via on-board microphones). As another example, the media playback system may query sensors (e.g., occupancy or temperature sensors), WiFi or cellular signals, network microphones, etc. to obtain a comprehensive assessment of the acoustic environment. If certain conditions are met based on the assessment, the media playback system can configure the first playback device to play content at a second resolution that is lower than the first resolution by, for example, reducing the number of audio channels included with audio broadcast to the first playback device, reducing the dynamic range (e.g., lower bitrate and/or bit depth) of the audio for playback, instructing the first playback device to disable one or more playback features, instructing the first playback device to play audio at a lower bitrate, and so on. In some cases, rather than configuring the first playback device to play content at another resolution, the media playback device may disable the first playback device so that it does not play anything at all, e.g. if the first playback device is a part of a group or bonded zone, and the assessed conditions indicate that playback by the first playback device is unlikely to be heard. Using conditions of the acoustic environment to inform the quality of content playback enables the media playback system to conserve resources when appropriate, which frees these resources up for or other purposes, even when there are no present or imminent resource shortages. Accordingly, the disclosed media playback system and devices may conserve resources (e.g. power consumption, network bandwidth, etc., among others) by selectively reducing audio quality with minimal impact to the listening experience.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves. For example, one of ordinary skill in the art will recognize that various actions described as being performed by a single actor may be performed by a group of actors and vice versa.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

To facilitate synchronous playback, the playback device(s) described herein may, in some embodiments, be configurable to operate in (and/or switch between) different modes such as an audio playback group coordinator mode and/or an audio playback group member mode. While operating in the audio playback group coordinator mode, the playback device may be configured to coordinate playback within the group by, for example, performing one or more of the following functions: (i) receiving audio content from an audio source, (ii) using a clock (e.g., a physical clock or a virtual clock) in the playback device to generate playback timing information for the audio content, (iii) transmitting portions of the audio content and playback timing for the portions of the audio content to at least one other playback device (e.g., at least one other playback device operating in an audio playback group member mode), (iv) transmitting timing information (e.g., generated using the clock to the at least one other playback device; and/or (v) playing back the audio content in synchrony with the at least one other playback device using the generated playback timing information and/or the clock. While operating in the audio playback group member mode, the playback device may be configured to perform one or more of the following functions: (i) receiving audio content and playback timing for the audio content from the at least one other device (e.g., a playback device operating in an audio playback group coordinator mode); (ii) receiving timing information from the at least one other device (e.g., a playback device operating in an audio playback group coordinator mode); and/or (iii) playing the audio content in synchrony with at least the other playback device using the playback timing for the audio content and/or the timing information.

a. Suitable Media Playback System

Figure 1B:
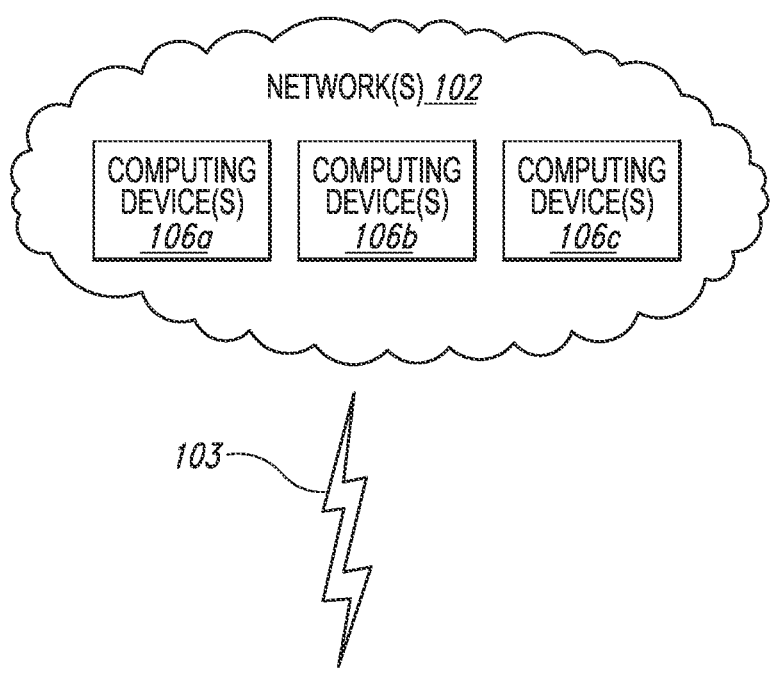
FIG. 1B shows a schematic diagram of the media playback system of FIG. 1A and one or more networks.
Figure 1B:
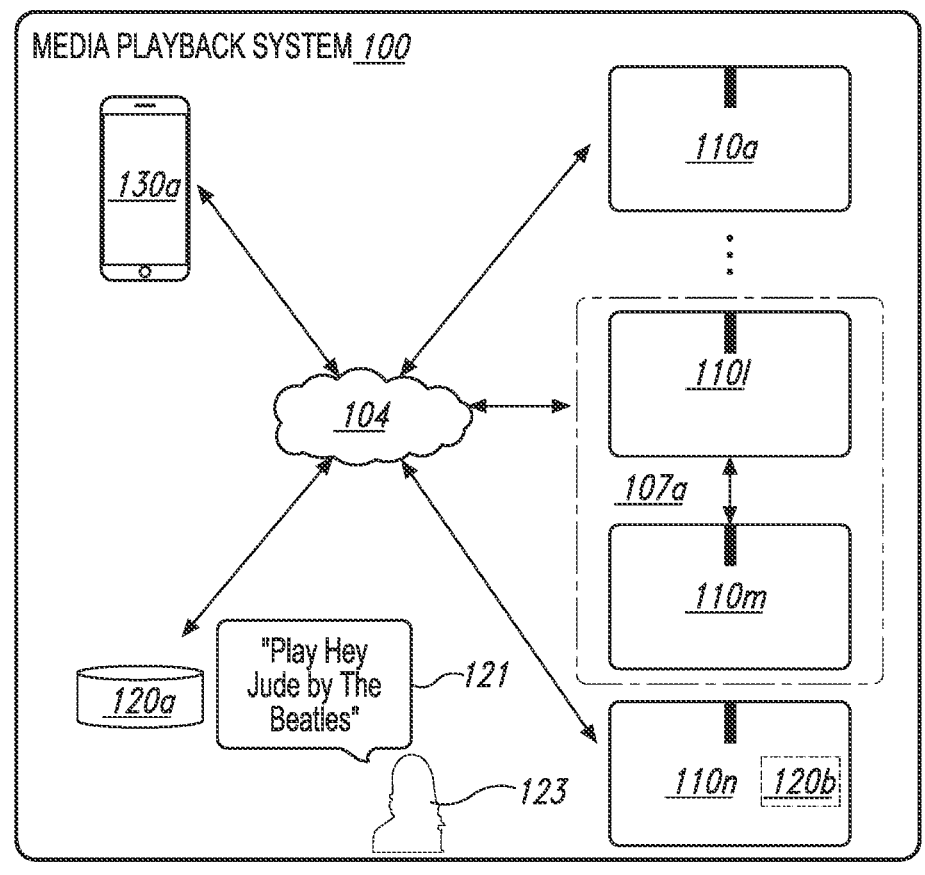

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN) (e.g., the Internet), one or more local area networks (LAN) (e.g., one or more WiFi networks), one or more personal area networks (PAN) (e.g., one or more BLUETOOTH networks, Z-WAVE networks, wireless Universal Serial Bus (USB) networks, ZIGBEE networks, and/or IRDA networks), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct or indirect connections, PANs, LANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

As described in more detail elsewhere herein, in some examples the power components 112i can include one or more of: a wireless power transmitter (e.g., a laser, induction coils, etc.), a wireless power receiver (e.g., a photovoltaic cell, induction coils, etc.), an energy storage component (e.g., a capacitor, a rechargeable battery), an energy harvester, a wired power input port, and/or associated power circuitry. In operation, the playback device 110a can be configured to transmit wireless power to one or more external devices. Additionally or alternatively, the playback device 110a can be configured to receive wireless power from one or more external transmitter devices, instead of or in addition to receiving power over a wired connection.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appre-ciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). The headphone may comprise a headband coupled to one or more earcups. For example, a first earcup may be coupled to a first end of the headband and a second earcup may be coupled to a second end of the headband that is opposite the first end. Each of the one or more earcups may house any portion of the electronic components in the playback device, such as one or more transducers. Further, the one or more of earcups may include a user interface for controlling operation of the headphone such as for controlling audio playback, volume level, and other functions. The user interface may include any of a variety of control elements such as buttons, knobs, dials, touch-sensitive surfaces, and/or touch-screens. An ear cushion may be coupled each of the one or more earcups. The ear cushions may provide a soft barrier between the head of a user and the one or more earcups to improve user comfort and/or provide acoustic isolation from the ambient (e.g., provide passive noise reduction (PNR)). Additionally (or alternatively), the headphone may employ active noise reduction (ANR) techniques to further reduce the user's perception of outside noise during playback.

In some instances, the headphone device may take the form of a hearable device. Hearable devices may include those headphone devices (e.g., ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.).

In some embodiments, one or more of the playback devices 110 comprise a docking station and/or an interface configured to interact with a docking station for personal mobile media playback devices. In certain embodiments, a playback device may be integral to another device or component such as a television, a projector, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figures 1F, 1G, 1H:
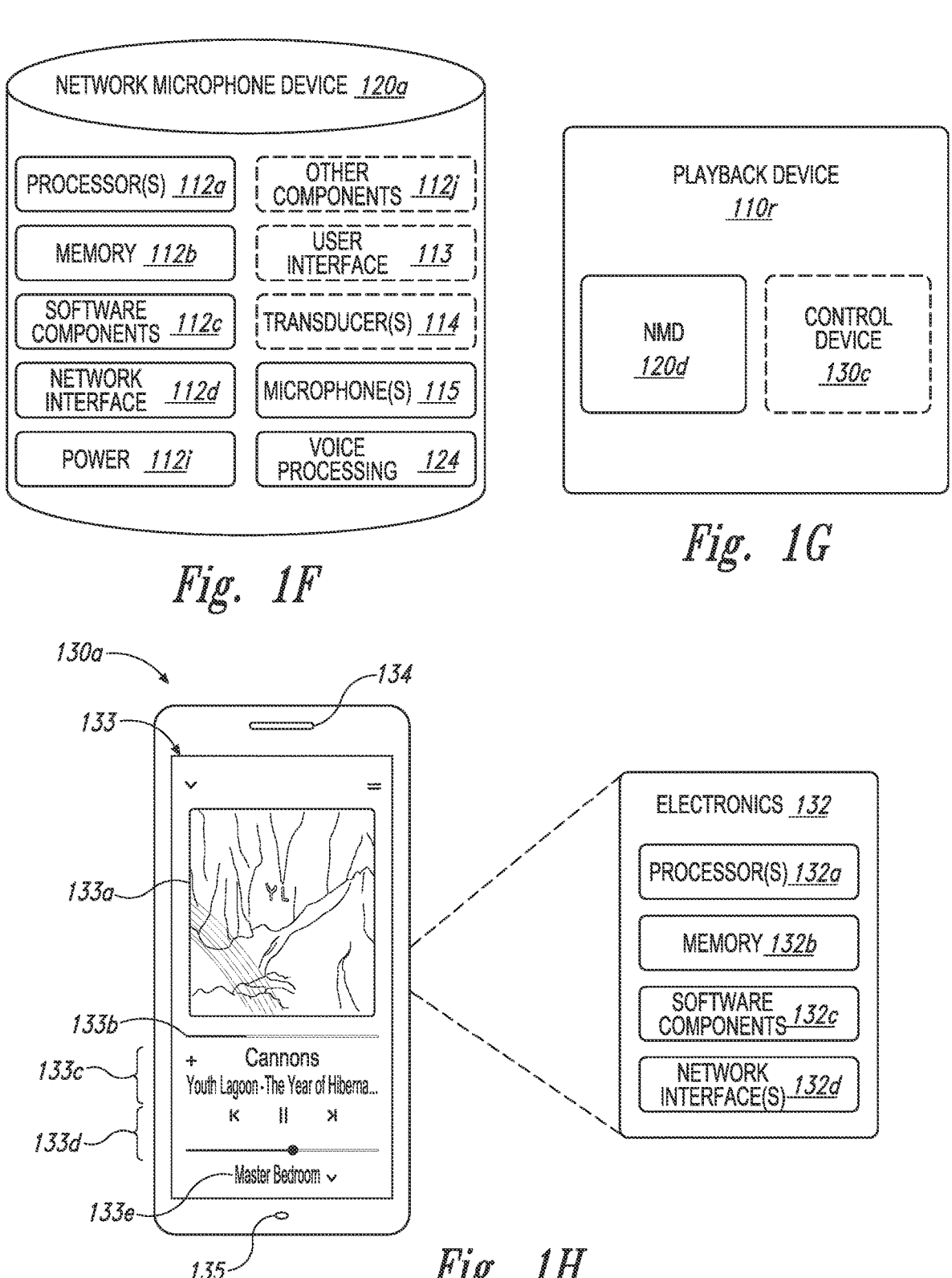
FIG. 1F shows a block diagram of a network microphone device.
FIG. 1G shows a block diagram of a playback device.
FIG. 1H shows a partially schematic diagram of a control device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, the power components 112*i*, and the microphones 115. As described elsewhere herein, the power components 112*i* can include one or more of: a wireless power transmitter (e.g., a laser, induction coils, etc.), a wireless power receiver (e.g., a photovoltaic cell, induction coils, etc.), an energy storage component (e.g., a capacitor, a rechargeable battery), an energy harvester, a wired power input port, and/or associated power circuitry. In operation, an NMD 120*a* can be configured to transmit wireless power to one or more external devices. Additionally or alternatively, the NMD 120*a* can be configured to receive wireless power from one or more external transmitter devices, in addition to or instead of receiving power over a wired connection.

The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

FIGS. 1-I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Figure 1M:
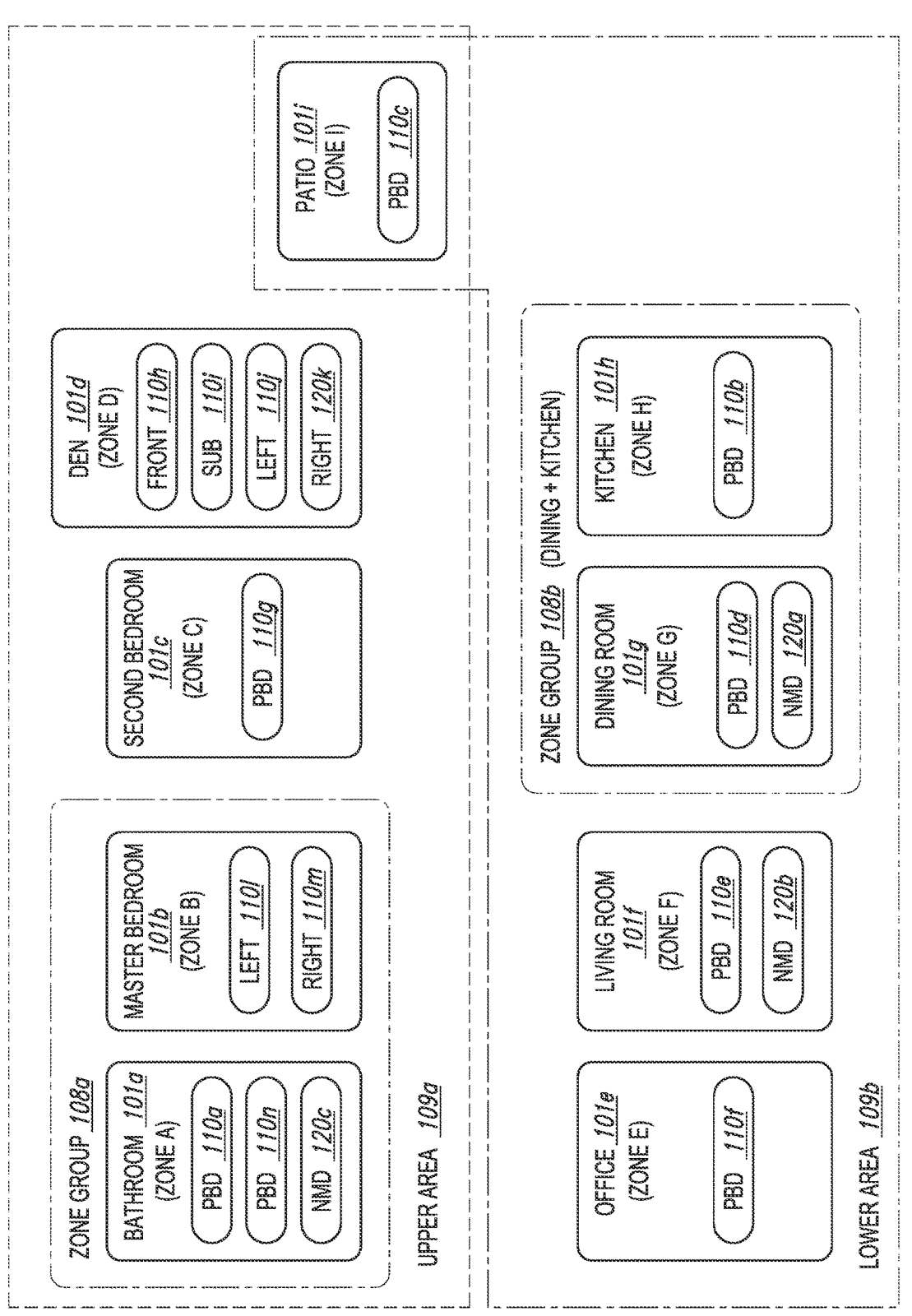
FIG. 1M shows a schematic diagram of media playback system areas.

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and entitled "Room Association Based on Name," and U.S. Pat. No. 8,483,853 filed Sep. 11, 2007, and entitled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
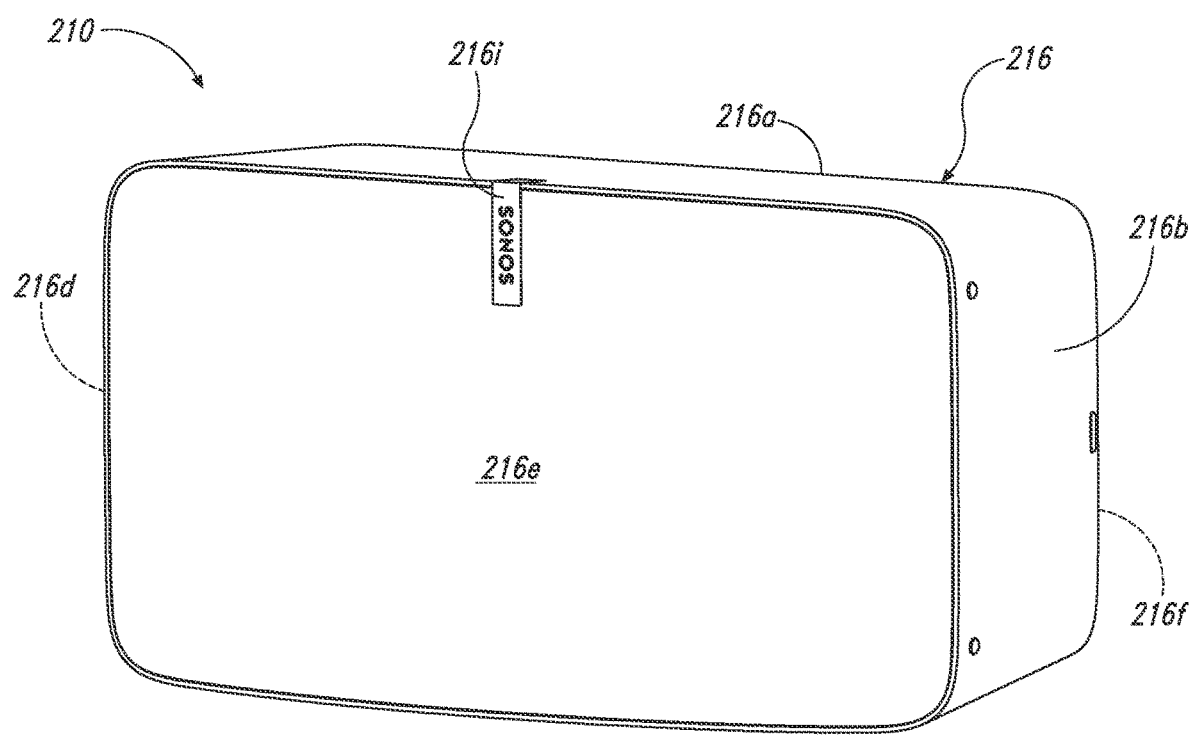
FIG. 2A shows a front isometric view of a playback device configured in accordance with aspects of the disclosed technology.
Figure 2B:
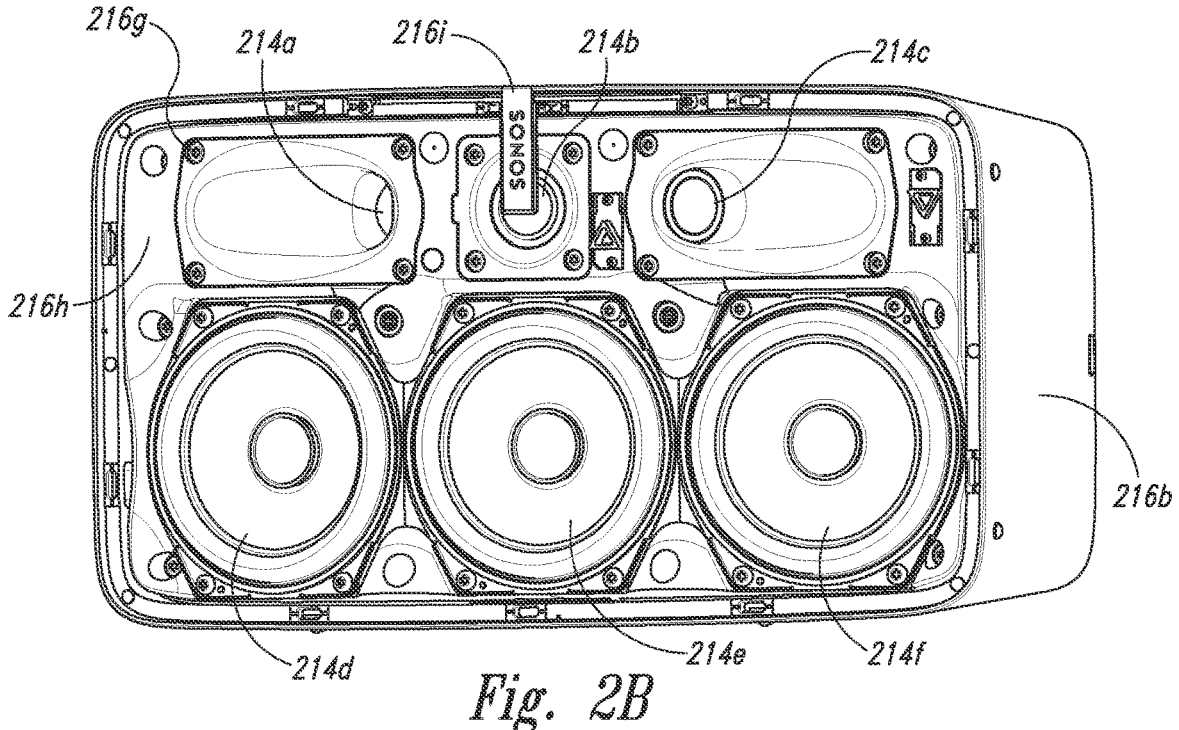
FIG. 2B shows a front isometric view of the playback device of FIG. 3A without a grille.
Figure 2C:
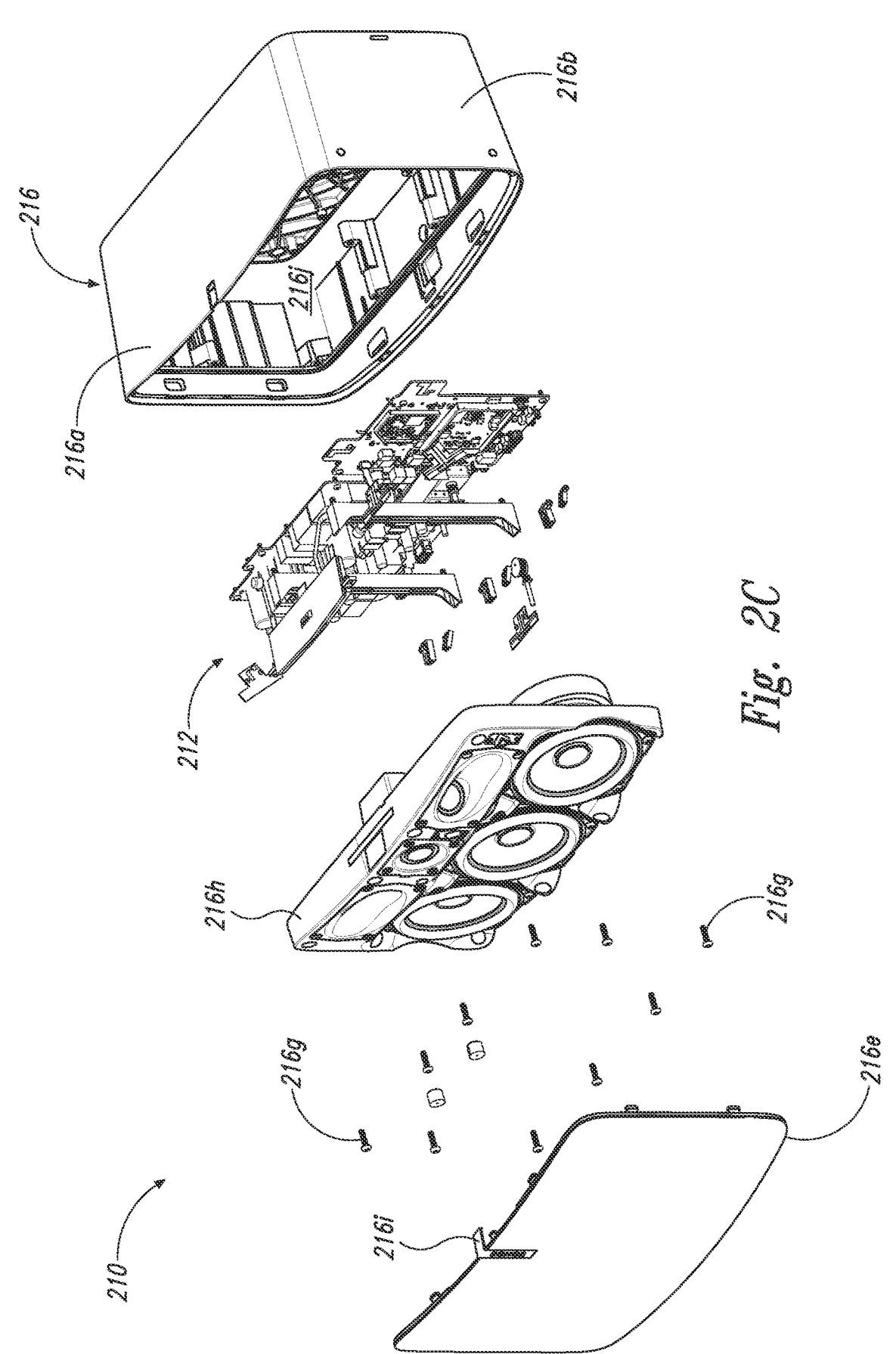
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 2D:
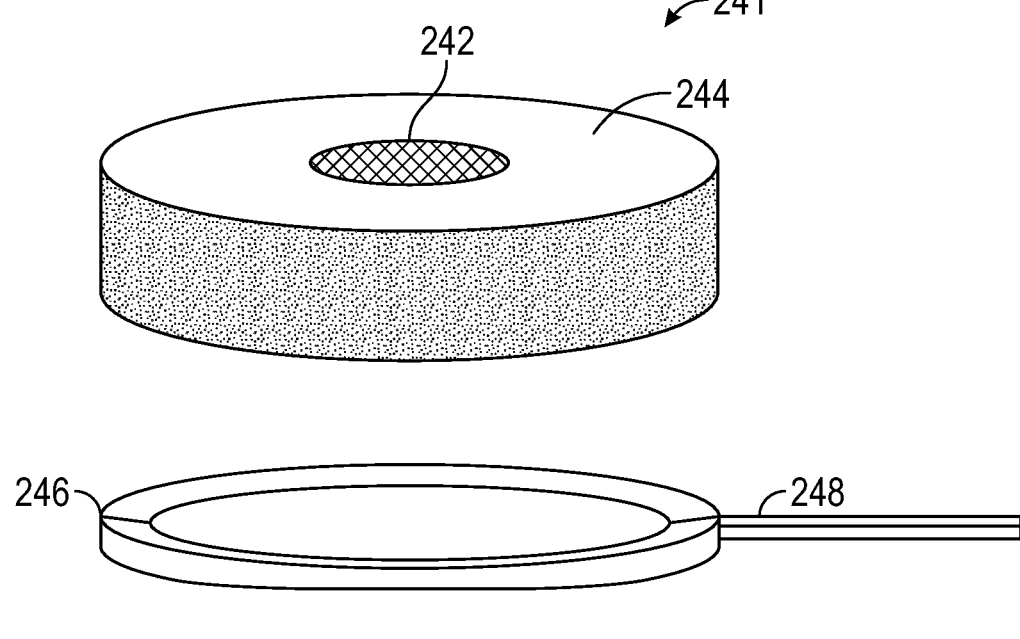
FIG. 2D is a diagram of another example housing for a playback device.

In some examples, the playback device 110 may be constructed as a portable playback device, such as an ultra-portable playback device, that comprises an internal power source. FIG. 2D shows an example housing 241 for such a portable playback device. As shown, the housing 241 of the portable playback device includes a user interface in the form of a control area 242 at a top portion 244 of the housing 241. The control area 242 may include a capacitive touch sensor for controlling audio playback, volume level, and other functions. The housing 241 of the portable playback device may be configured to engage with a dock 246 that is connected to an external power source via cable 248. The dock 246 may be configured to provide power to the portable playback device to recharge an internal battery. In some examples, the dock 246 may comprise a set of one or more conductive contacts (not shown) positioned on the top of the dock 246 that engage with conductive contacts on the bottom of the housing 241 (not shown). In other examples, the dock 246 may provide power from the cable 248 to the portable playback device without the use of conductive contacts. For example, the dock 246 may wirelessly charge the portable playback device via one or more inductive coils integrated into each of the dock 246 and the portable playback device.

Figure 2E:
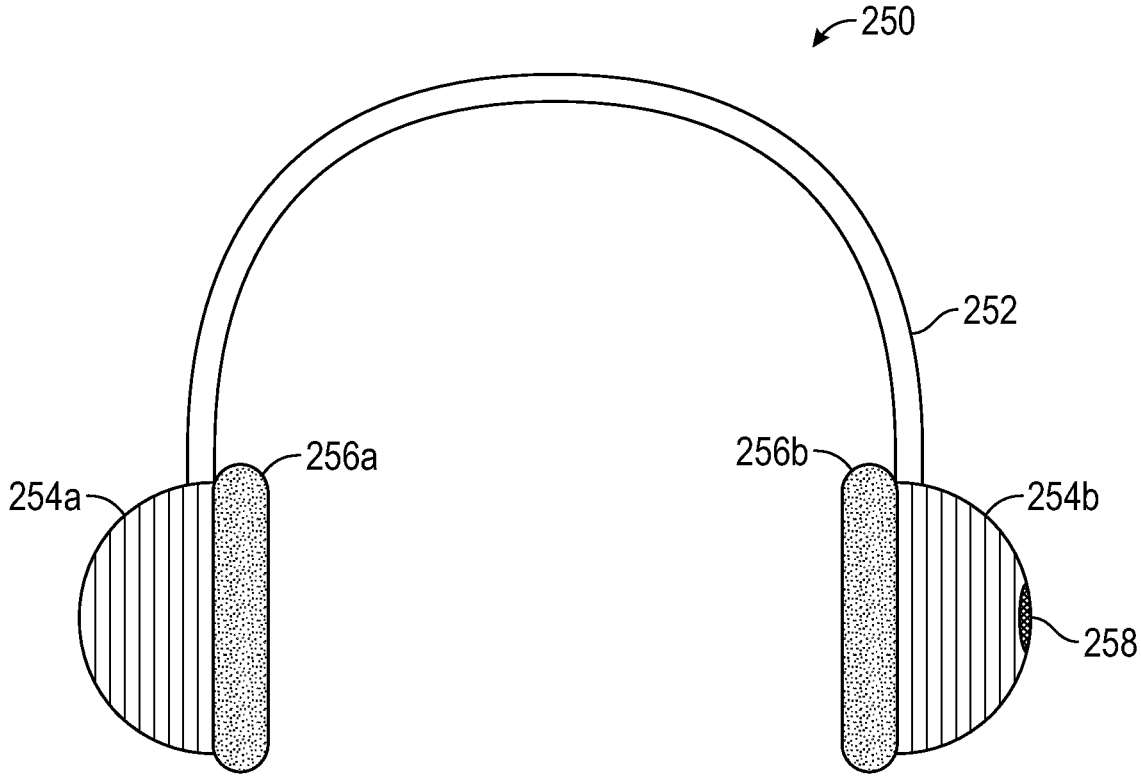
FIG. 2E is a diagram of another example housing for a playback device.

In some examples, the playback device 110 may take the form of a wired and/or wireless headphone (e.g., an over-ear headphone, an on-ear headphone, or an in-ear headphone). For instance, FIG. 2E shows an example housing 250 for such an implementation of the playback device 110. As shown, the housing 250 includes a headband 252 that couples a first earpiece 254a to a second earpiece 254b. Each of the earpieces 254a and 254b may house any portion of the electronic components in the playback device, such as one or more speakers, and one or more microphones. In some instances, the housing 250 can enclose or carry one or more microphones. Further, one or more of the earpieces 254a and 254b may include a control area 258 for controlling audio playback, volume level, and other functions. The control area 258 may comprise any combination of the following: a capacitive touch sensor, a button, a switch, and a dial. As shown in FIG. 2D, the housing 250 may further include ear cushions 256a and 256b that are coupled to earpieces 254a and 254b, respectively. The ear cushions 256a and 256b may provide a soft barrier between the head of a user and the earpieces 254a and 254b, respectively, to improve user comfort and/or provide acoustic isolation from the ambient (e.g., passive noise reduction (PNR)). In some implementations, the wired and/or wireless headphones may be ultraportable playback devices that are powered by an internal energy or power source and weigh less than fifty ounces.

In some examples, the playback device 110 may take the form of an in-ear headphone device. It should be appreciated that the playback device 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of playback and network microphone devices have been described herein, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 110 is described with reference to MPS 100, one skilled in the art will recognize that playback devices as described herein can be used in a variety of different environments, including (but not limited to) environments with more and/or fewer elements, without departing from this invention. Likewise, MPS s as described herein can be used with various different playback devices.

Figure 3A:
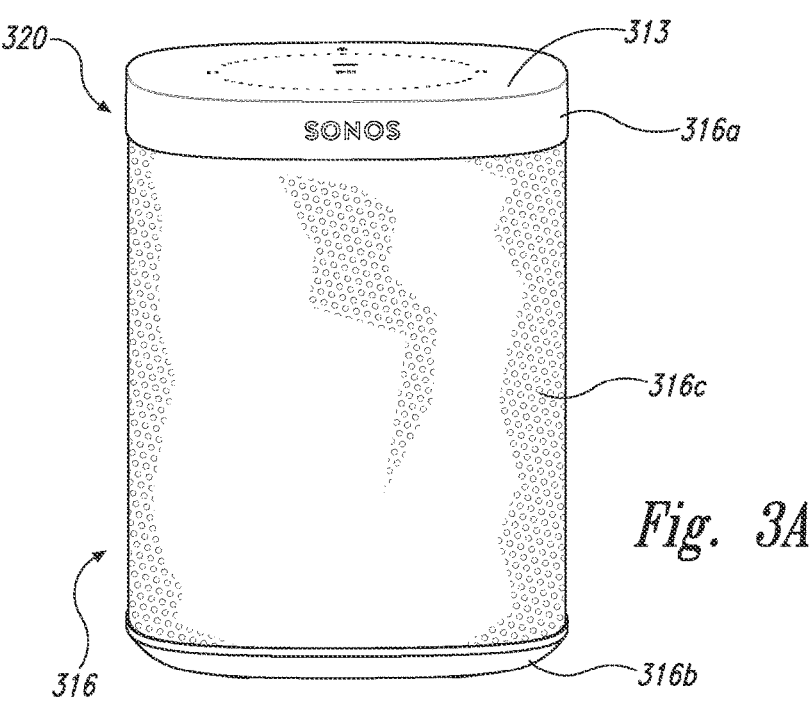
FIG. 3A shows a front view of a network microphone device configured in accordance with aspects of the disclosed technology.
Figure 3B:
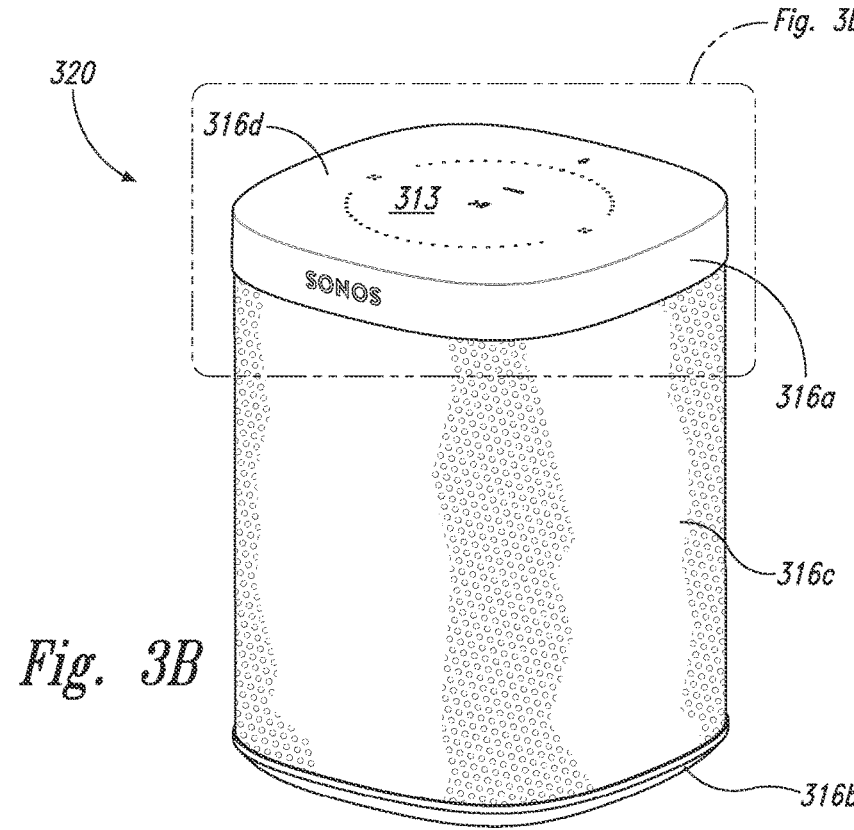
FIG. 3B shows a side isometric view of the network microphone device of FIG. 3A.
Figure 3C:
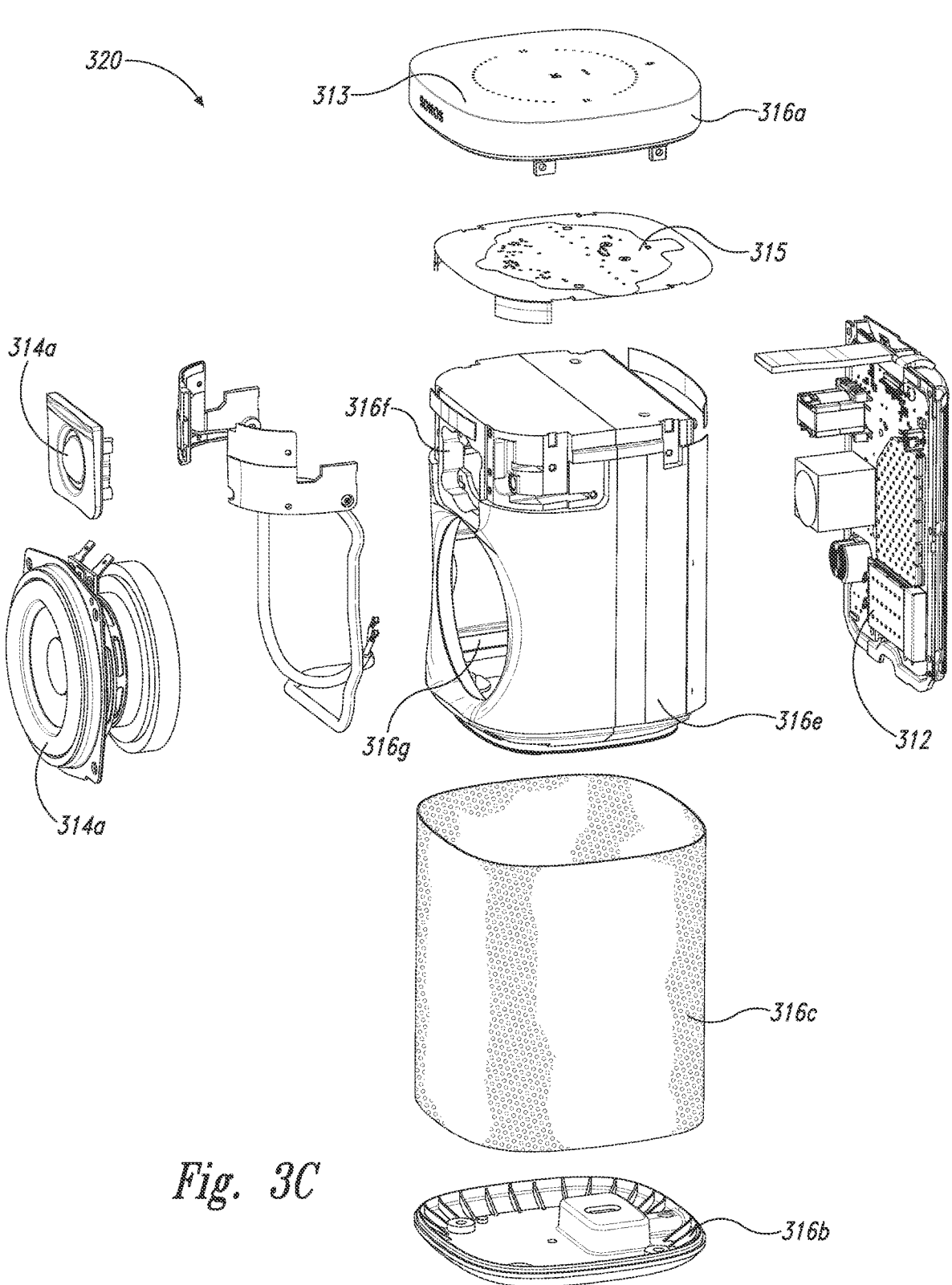
FIG. 3C shows an exploded view of the network microphone device of FIGS. 3A and 3B.
Figure 3D:
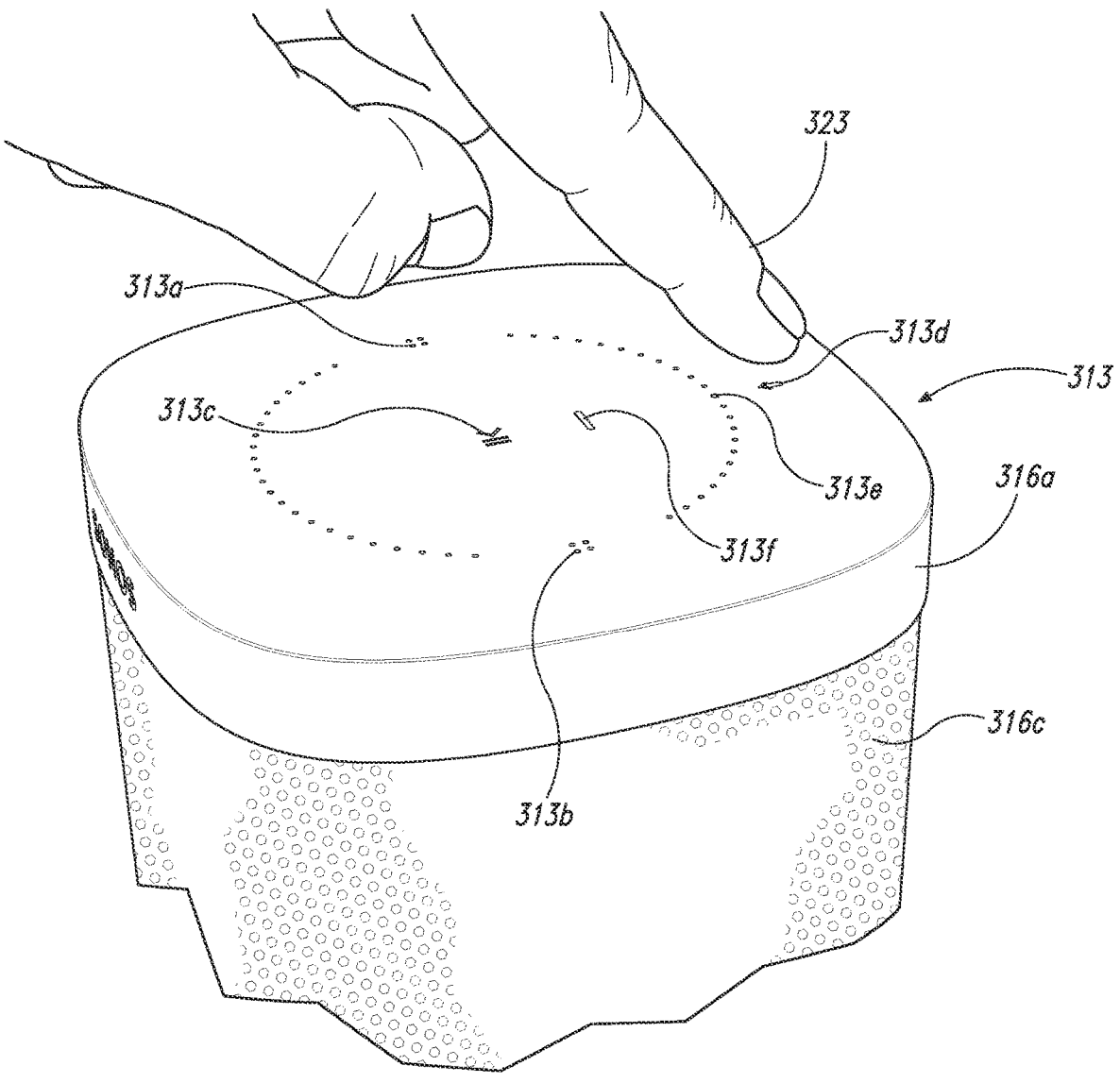
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes, or apertures 316d in the upper portion 316a allow sound to pass through to one or more microphones 315 (FIG. 3C) positioned within the housing 316. The one or more microphones 315 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10*m* or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
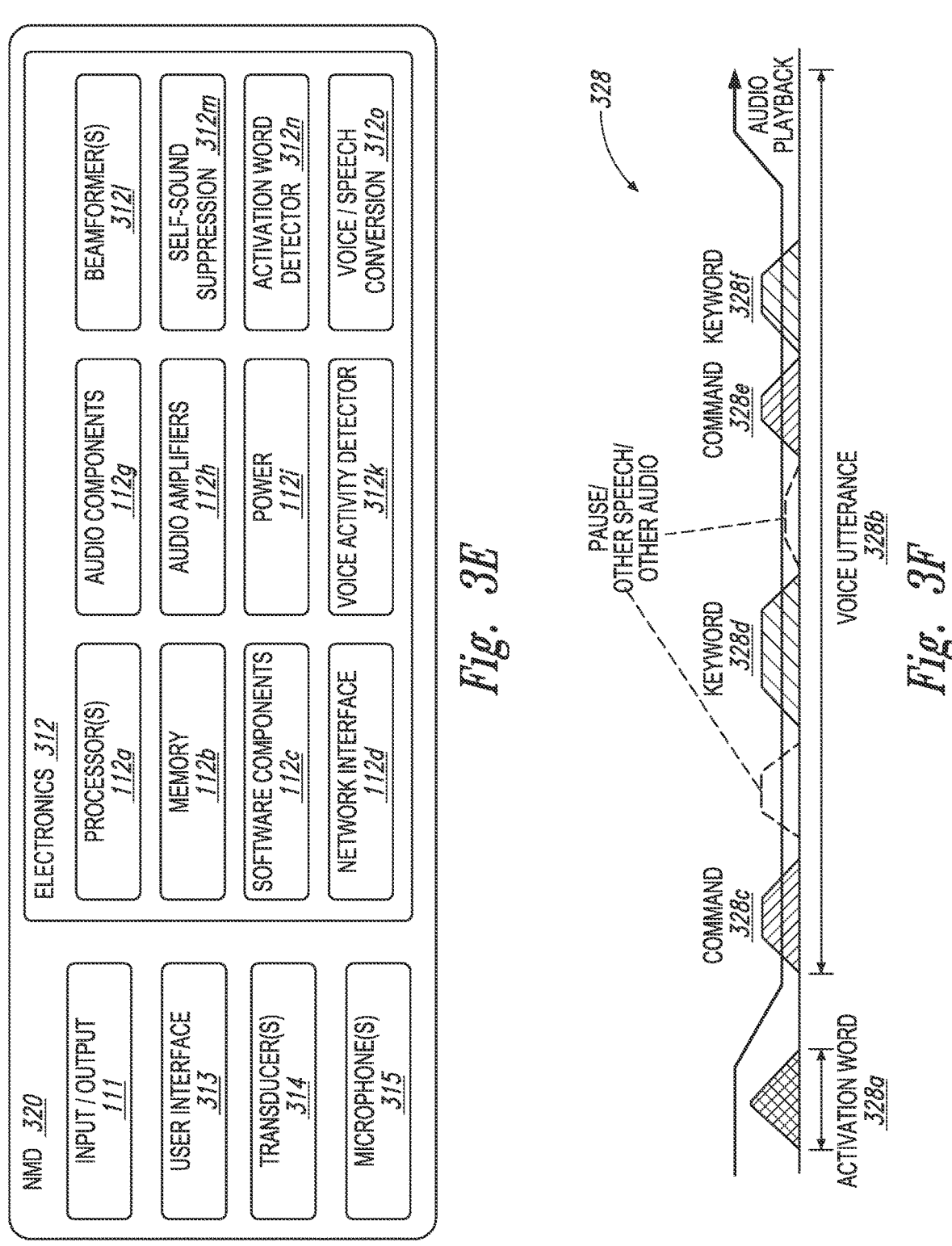
FIG. 3E shows a block diagram of the network microphone device of FIGS. 3A-3D
FIG. 3F shows a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 3280. In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figures 4A, 4B, 4C, 4D:
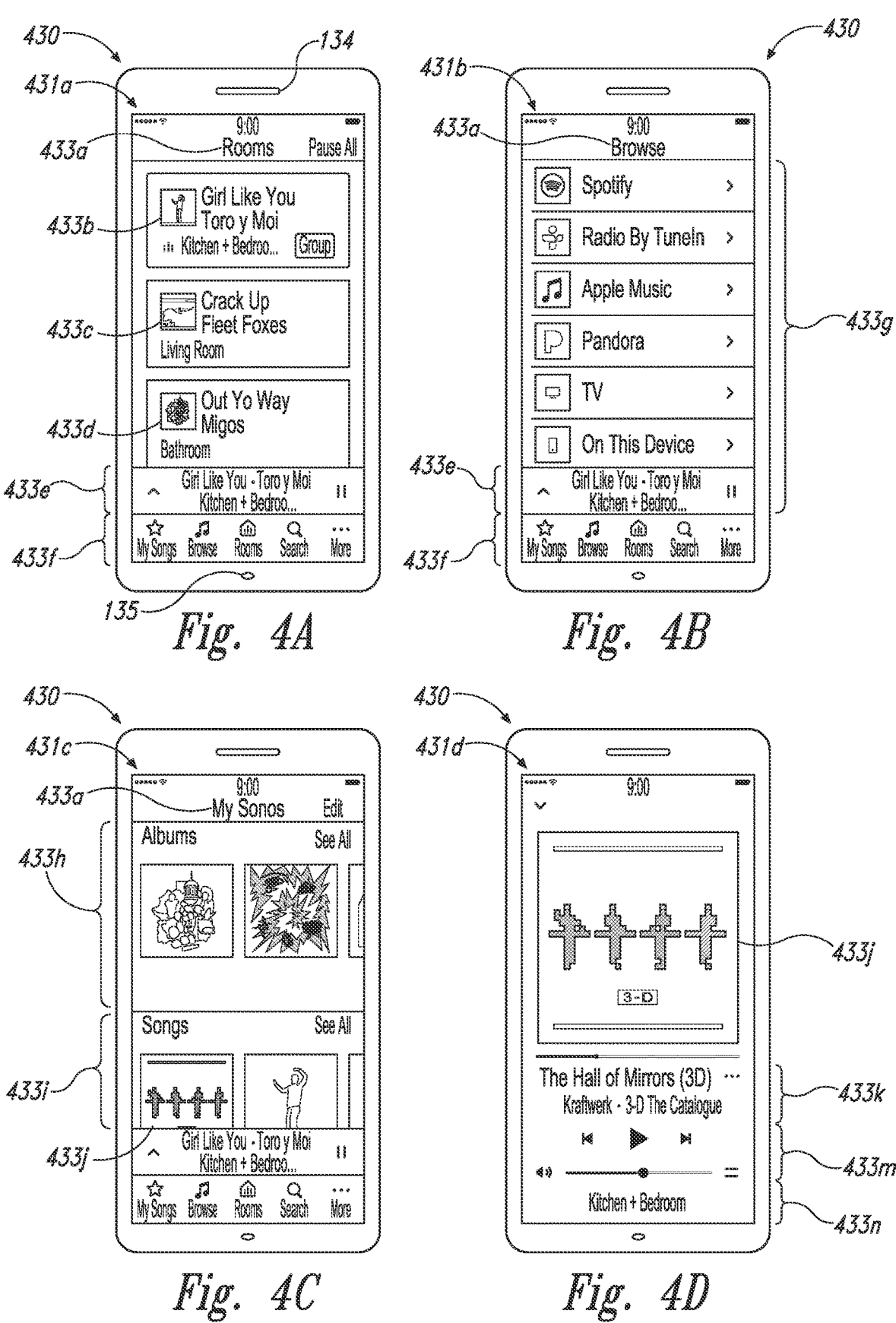
FIGS. 4A-4D show schematic diagrams of a control device in various stages of operation in accordance with aspects of the disclosed technology.

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
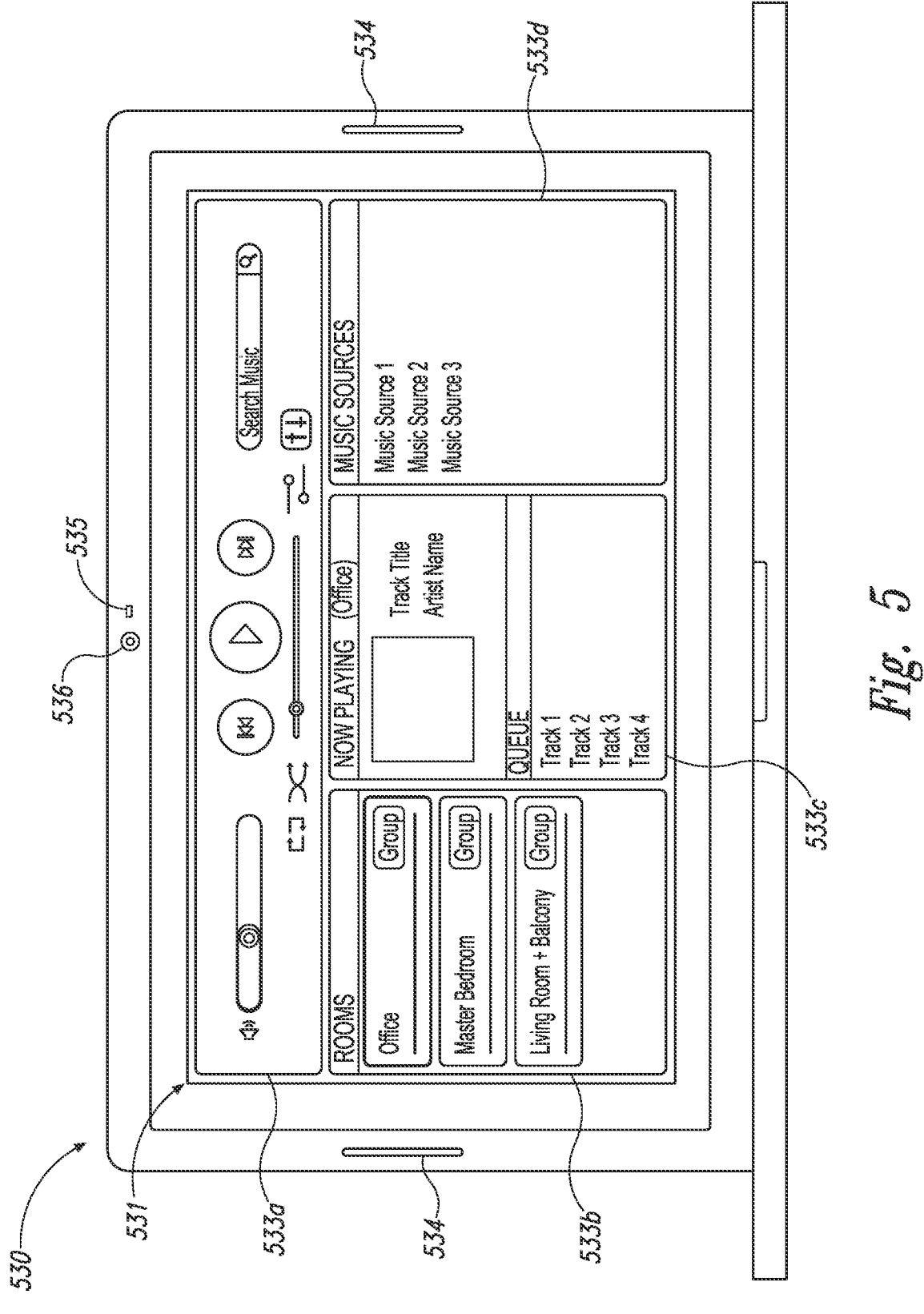
FIG. 5 shows a front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as a playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
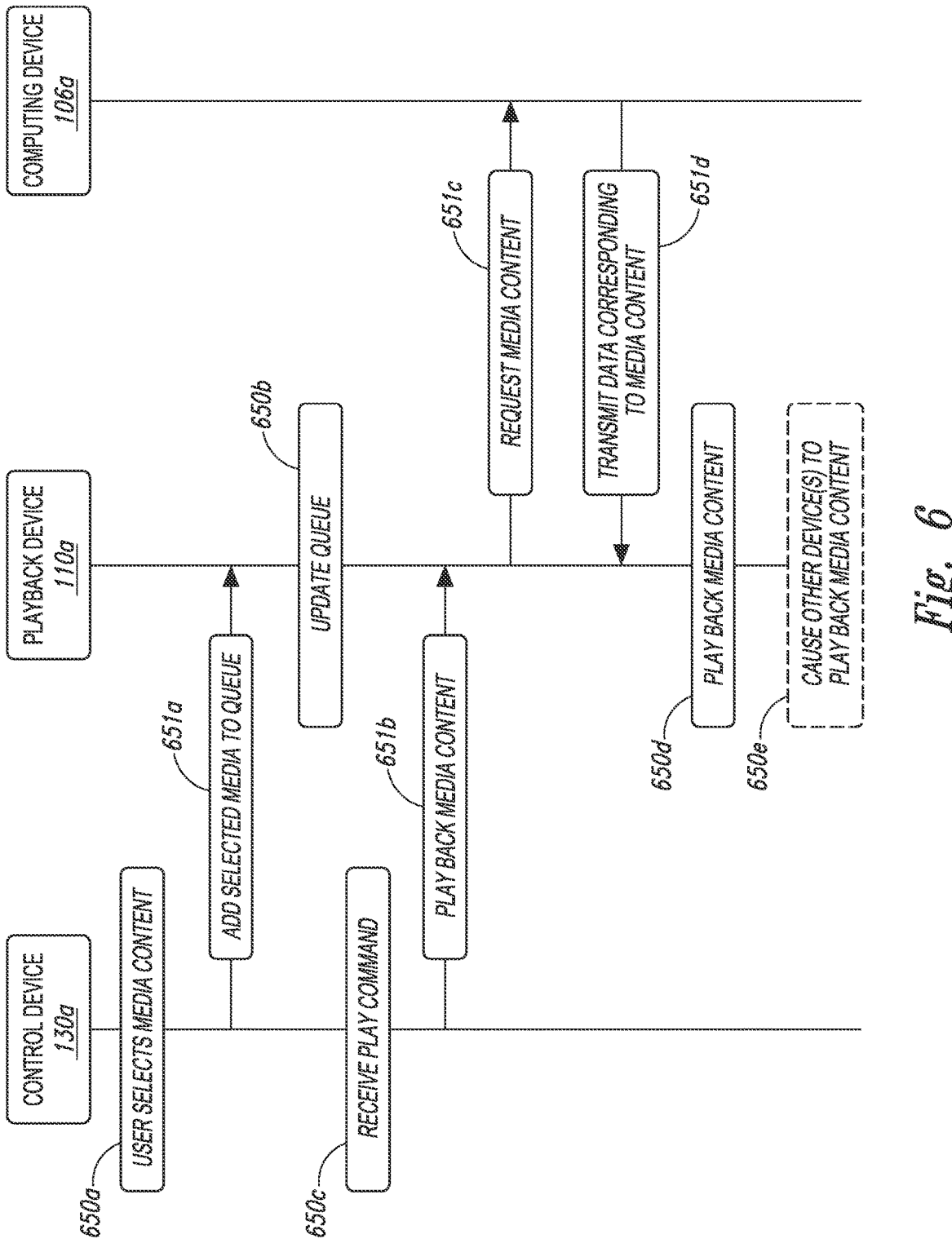
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Example Systems and Methods for Reducing Audio Quality Based on Acoustic Environment Systems and methods for detecting conditions of an acoustic environment to determine a quality or resolution of audio that should be provided to, or played by, playback devices in the acoustic environment are disclosed. Using the disclosed systems and methods a media playback system can determine when resources can be conserved, by reducing audio quality, with minimal impact to the listening experience. In some embodiments, the media playback system collects information from various sensors and devices in and around the acoustic environment, processes that information collectively (e.g., by a controller or other device associated with the media playback system, in the cloud, etc.), and then modifies a signal or playback parameters of playback devices in the acoustic environment. In some embodiments, individual playback devices collect information about the acoustic environment (or a detectable area around the individual playback device), process the collected information, and then modify their individual playback parameters (including a quality of content provided by a content source) with or without collaboration with other devices. Accordingly, the media playback system may perform the disclosed audio quality reduction techniques on a group playback device level, on an individual playback device level, and/or some combination thereof. By reducing audio quality, the media playback system frees up resources required to provide the higher quality audio so that these resources can be used for other purposes. For example, reducing audio quality may reduce the network bandwidth demand for audio playback, thereby allowing users to use those resources to stream higher quality video, surf the web, video conferencing, etc. As another example, reducing audio quality may reduce power consumption, thereby saving costs and benefiting the environment. Further, in the case of battery-powered playback devices, reducing power consumption may extend playback time, improve battery life, and/or reduce damage to the battery, etc., among other benefits.

The media playback system may use any number of devices and sensors to assess the acoustic environment. In some embodiments, the media playback system uses microphones in the acoustic environment, such as microphones integrated into playback devices or other devices associated with the media playback system, to measure noise levels, to assess the types of noises in the acoustic environment, to determine a probability of whether the acoustic environment is an outdoor acoustic environment or an indoor acoustic environment (or some combination). For example, the media playback system may use one or more microphones to assess the ambient noise in the acoustic environment. In this example, if the assessed ambient noise is above a predetermined threshold, the media playback system reduces audio quality based on the level of ambient noise. Thus, audio quality reduction can occur along a continuous spectrum based on the conditions of the acoustic environment. For example, if the ambient noise is just above the predetermined threshold, the media playback system may drop one channel of the audio or adjust the bitrate of the audio from 320 Kbps to 256 Kbps. As another example, if the ambient noise is significantly higher than the predetermined threshold (e.g., 20 dB higher, 32 dB higher, 40 dB higher), the media playback system may drop all but one channel of audio, adjust the bitrate of the audio from 320 Kbps to 32 Kbps, etc.

In some embodiments, the media playback system uses one or more microphones to measure audio reflection. If the measured audio reflection level exceeds a predetermined threshold, the media playback system may assume that the microphone is indoors, and vice versa. In some cases, the determined probability is proportional to the measured audio reflection level. The media playback system may also use WiFi connectivity to inform or adjust the probability by increasing a determined probability that a microphone is indoors if the microphone is a component of a device that is connected to a WiFi network. Conversely, the media playback system may adjust the probability downwards if the microphone is a component of a device that is not connected to a WiFi network. If the determined probability exceeds a predetermined threshold (e.g., 40%, 50%, 75%, 80%), the media playback system may adjust the audio playback quality accordingly. In a typical outdoor environment, high frequency audio signals tend to attenuate quickly. Accordingly, if the media playback system determines that the probability that a particular playback device is outdoors is sufficient, the media playback system can reduce playback of the high frequency audio signals by filtering them out, adjusting a dynamic range, and so on. In some cases, rather than filtering out individual channels, the media playback system reduces the quality of those individual channels by, for example, adjusting a compression rate or sampling rate for those channels, combining one or more of those channels, and so on.

In some embodiments, the media playback system uses occupancy and user location information to assess the acoustic environment and uses this information to determine whether and how to modify audio playback. For example, the media playback system may query one or more occupancy sensors to determine whether there are any people in the acoustic environment, how many people there are in the acoustic area, the location of people in the acoustic area, etc. As another example, if the media playback system detects an increase in temperature (e.g., via a temperature sensor) without a corresponding increase in a thermostat setting and/or outdoor temperature, the media playback system may assume that a group of people have entered the acoustic environment. In some cases, the media playback system may rely on other types of signals to determine or estimate the number and location of people in the acoustic environment, such as signal strength (e.g., WiFi, BLUETOOTH, cellular, etc.) of mobile devices in the acoustic area. For example, the media playback system can use individual playback devices with integrated WiFi antennas to assess signals and a corresponding Received Signal Strength Indicator (RSSI) from one or more devices, such as cellular phones or other mobile devices, and corresponding timestamps to triangulate the location of the one or more devices. These triangulated locations can serve as proxies for user locations. As another example, a "smart" home, "smart" office, or other "smart" building may detect users throughout. In these cases, the media playback system may query the "smart" building for current occupancy and location information. One of ordinary skill in the art will recognize that the media playback system may employ any number of methods for determining or estimating user presence and location. For example, U.S. Pat. No. 9,084,058, entitled "Sound field calibration using listener localization," which is hereby incorporated by reference in its entirety, describes techniques for determining or estimating a user's or listener's location based on, for example, infrared technology, wireless signals, microphones, location sensors, and so on.

In some embodiments, the media playback system adjusts audio quality based on occupancy and location information. For example, if there are no users within a predetermined distance from a playback device (e.g., 10 feet, 25 feet, etc.), the media playback system may disable that device, reduce the number of audio channels received and played back by that device, increase the compression rate of an audio signal sent to that device, and so on. In some cases, if a media playback system includes two playback devices playing as a stereo pair, i.e. one playback device is playing right channel audio content while the other playback device is playing left channel audio content, and the media playback system determines that no users are within the predetermined distance from the playback device playing the left channel audio content, the media playback device may configure the playback device playing the right channel audio content to begin playing full left and right channel audio content, i.e. as a mono playback device, and configure the playback device playing the left channel audio content to also play the full left and right channel audio content or stop playback altogether.

Moreover, in the case one of the playback devices is configured to stop playback altogether, i.e. disabled, and the disabled playback device was part of a coordinated playback group, the playback group coordinator can terminate coordination of the disabled playback device, thereby conserving processer and power resources of the playback group coordinator, in addition to the network bandwidth resources conserved. As another example, if the media playback system determines that a user is moving around in the acoustic environment, the media playback system may direct higher quality audio to playback devices in the user's vicinity (within a predetermined threshold (e.g., 5 feet, 10 feet, 25 feet, etc.)) at any particular moment and lower quality audio (or none at all) to playback devices outside of the user's vicinity. As another example, if the media playback system determines (or estimates) that there are more than a threshold number of people or people per area in the acoustic environment, the media playback system may assume that the ambient noise is high and reduce audio playback quality to conserve resources.

In some embodiments, the media playback uses multiple types of information about the acoustic environment to determine a level of audio quality to provide. As mentioned above, if the media playback system detects (or estimates) more than a threshold number of people in an acoustic environment, the media playback system may assume there is a lot of ambient noise based on the number of people. However, if the media playback system also has access to one or more microphones in the acoustic environment, the media playback system can measure the ambient noise levels to confirm (or refute) this assumption. Thus, if a group of people are quietly (e.g., ambient noise level below a predetermined threshold, such as 20 dB, 34 dB, 45 dB) watching, for example, a film or listening to a broadcast of the New York Philharmonic, the media playback system can avoid reducing audio quality, even when several users are present, so that users who are enjoying and able to take advantage of the higher audio quality are not impacted. Accordingly, the disclosed media playback system can take advantage of sensor fusion techniques to ensure user enjoyment.

The media playback system may reduce audio quality (and conserve resources) using any number of techniques. In some embodiments, when user location information is available, the media playback system may drop or filter out one or more audio channels. For example, if the media playback system determines that a user is watching a movie alone, but is seated close to one side of an audio spatial separation zone and far from the other side, the media playback system can simply send mono content rather than stereo (or higher quality) content for playback. As another example, if the media playback system determines that the acoustic or listening environment is noisy, the media playback system can reduce dynamic range (lower bit rate and bit depth) or otherwise cut high frequency content, which is usually lost in noisy environments. Moreover, because multichannel audio content can have a significant amount of overlap, the media playback system can broadcast a mono signal to all playback devices and request individual playback devices to extrapolate stereo/multichannel content (e.g. simulated stereo/5.1/7.1/virtual surround sound) based on their playback roles (e.g., front left, front right, rear left, rear right) rather than transmitting specific channel content to each playback device. Each of these techniques when used alone or in combination allow the media playback system to conserve resources so that they are available for other uses.

In some embodiments, the media playback system reduces the quality of audio from the playback devices by reducing the quality of audio transmitted to playback devices for playback. In some embodiments, the media playback system reduces the quality of audio from the playback devices by configuring the individual playback devices by, for example, sending an instruction to the playback devices to filter out one or more audio channels or to output audio at a lower bitrate. In some embodiments, the media playback system may reduce audio playback using a combination of these techniques.

In some embodiments, a user may set preferences for various aspects of the audio to ensure that the quality of the audio does not drop below the user's preferred levels. For example, the user may identify one or more audio frequencies or channels that should not be dropped or filtered out, a minimum bitrate, a minimum audio depth, a minimum sampling rate, and so on. Similarly, the user may establish maximum values as well, along with audio frequencies and channels that the user is not interested in and should be among the first to be filtered out or removed when reducing audio quality.

Figure 7:
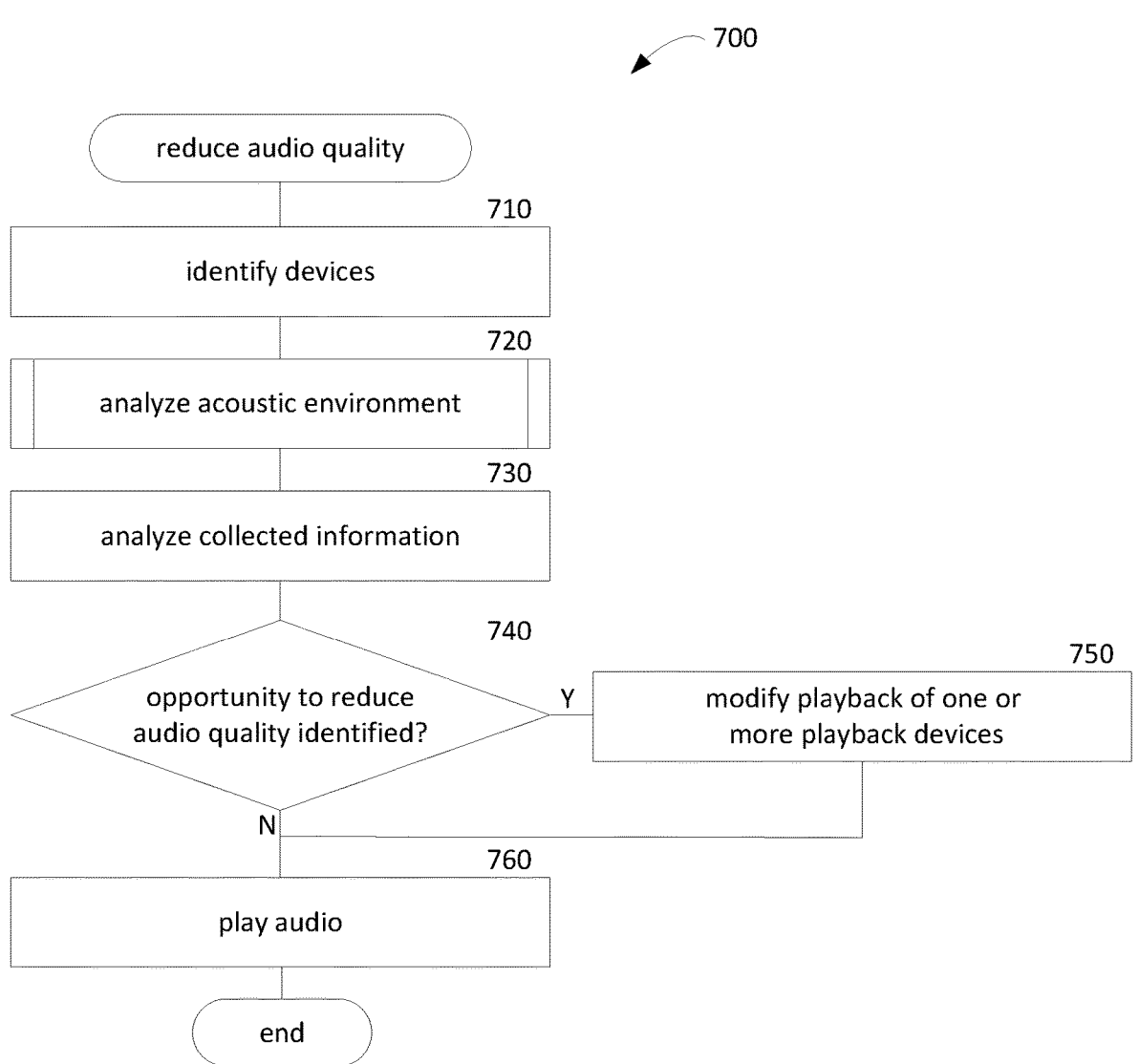
FIG. 7 illustrates an example method for reducing the quality of audio provided by one or more playback devices based on an acoustic environment.
Figure 8:
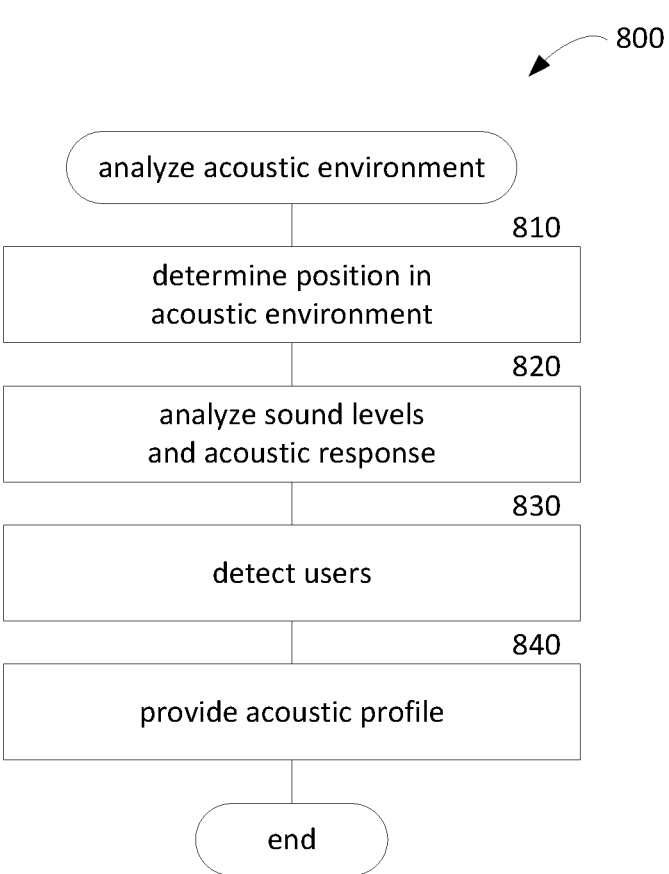
FIG. 8 illustrates an example method for analyzing at least a portion of an acoustic environment.
Figure 9:
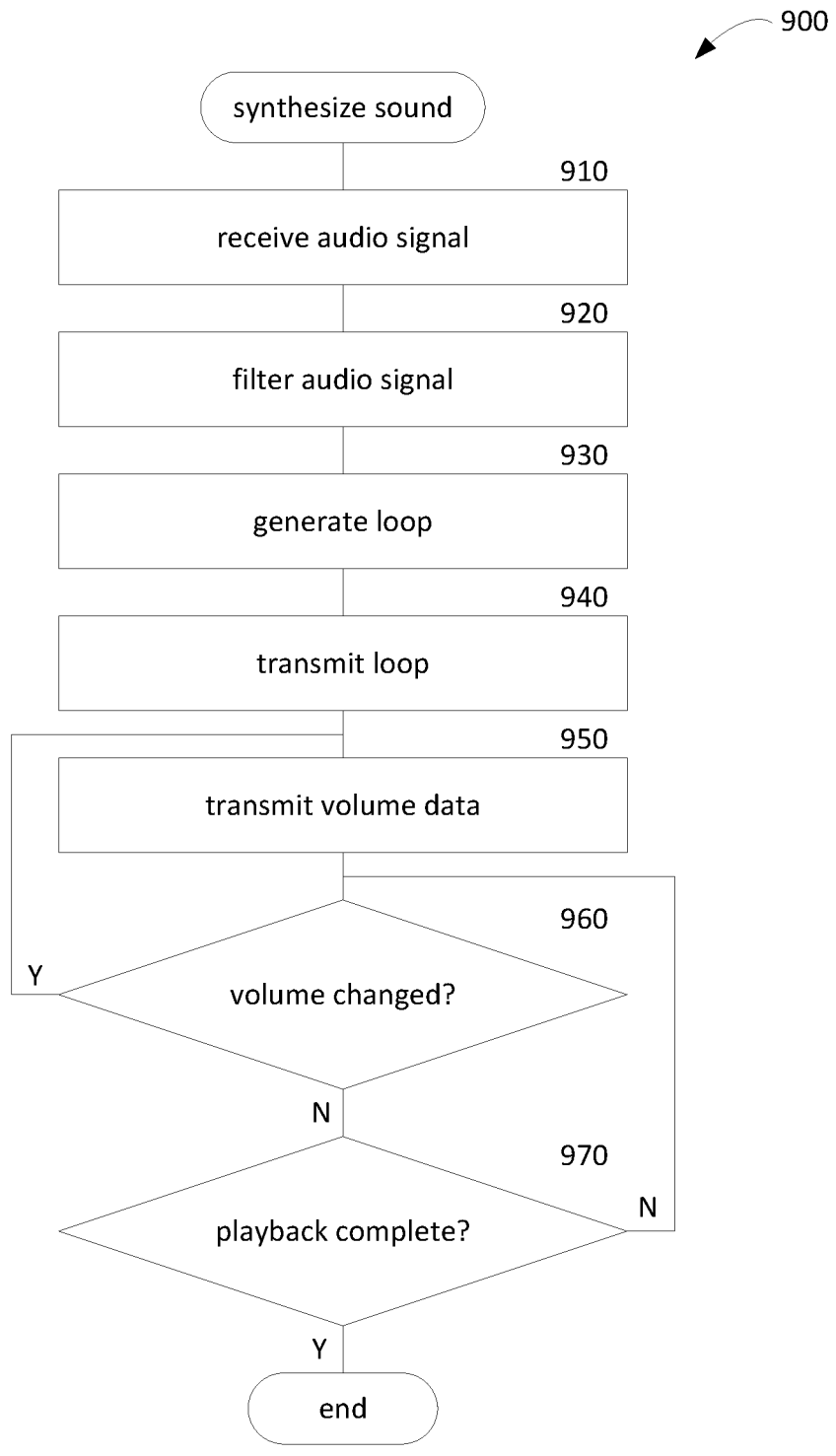
FIG. 9 illustrates an example method for synthesizing sound.

FIGS. 7-9 illustrate example methods in accordance with the present technology. The methods 700, 800, and 900 can be implemented by any of the devices described herein, or any other suitable devices now known or later developed. Various embodiments of the methods 700, 800, and 900 include one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the methods 700, 800, and 900 and for other processes and methods disclosed herein, the flowcharts show functionality and operation of possible implementations of some embodiments. In this regard, each block may represent a component, a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that store data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in FIGS. 7-9 may represent circuitry that is wired to perform the specific logical functions in the process.

FIG. 7 illustrates an example method 700 for reducing the quality of audio provided by one or more playback devices based on an acoustic environment in accordance with some embodiments of the disclosed technology. With reference to FIG. 7, the method 700 begins at block 710, which involves identifying devices for analyzing the acoustic environment, such as playback devices, microphones, occupancy sensors, temperature sensors and other sensors, mobile devices, and so on. For example, the media playback system may identify devices by accessing a device roster or manifest associated with the media playback system. As another example, the playback system may identify devices that are in proximity to the media playback system based on a determination that the media playback system and the device are communicatively coupled via a common local area network, based on a determination that they are in direct wireless communication (e.g., Bluetooth, NFC, ultra-wideband (UWB), etc.), based on a received signal strength indicator (RSSI), based on an audible chirp emitted via one device and detection via one or more microphones of another device, or any other suitable approach. As another example, the media system may query an automated system, such as a "smart" building or "smart" environment for a roster of available devices.

In block 720, the media playback system analyzes the acoustic environment by, for example, invoking an analyze acoustic environment component of each of one or more of the identified devices. In some cases, rather than invoking analyze acoustic environment components, the media system may request previously generated and stored acoustic environment information from the devices. In this manner, the devices can save power by reducing the number of times that they analyze their acoustic environment and provide cached information that is periodically refreshed (e.g., once every 10 minutes, once an hour, once a day, etc.). In some examples, analysis of the acoustic environment via each identified device may take place concurrently, in parallel.

In block 730, the media playback system analyzes the information collected from the identified devices by, for example, determining the levels of ambient noise in the acoustic environment, determining levels of sound reflection in the acoustic environment, determining the position of users in the acoustic environment, determining the quality of playback in the acoustic environment, and so on.

In decision block 740, if the media playback system identifies an opportunity to reduce audio quality, then the media playback system continues at block 750, otherwise the media playback system continues at block 760. For example, if a playback device is in a noisy area, poorly placed, or in an area where nobody can hear the playback device, the quality of audio provided to or played by that playback device can be reduced or disabled. In block 750, the media playback system modifies the playback of one or more of the playback devices. For example, the media playback system may modify playback of a playback device by adjusting or eliminating one or more audio channels of content provided to the playback device, changing a compression rate of audio transmitted to the playback device, sending an instruction to the playback device to downsample audio played by the device, sending an instruction to the playback device to disable one or more playback parameters or feature of the device (e.g., a "bass boost" feature, a playback coordination feature), and so on. As another example, the media playback system may use any techniques, or combinations thereof, for modifying audio described in U.S. Pat. No. 9,967,689, entitled "Conditional content enhancement," U.S. Pat. No. 9,763,018, entitled "Calibration of audio playback devices," U.S. Provisional Patent Application No. 63/362,365, filed on Apr. 1, 2022, entitled "MULTICHANNEL COMPRESSED AUDIO TRANSMISSION TO SATELLITE PLAYBACK DEVICES," and U.S. patent application Ser. No. 17/741, 071, filed on May 10, 2022, entitled "Dynamic Transcoding for Enhancing Audio Playback," each of which is herein incorporated by reference in its entirety. In some cases, the media playback system may modify playback in accordance with one or more user preferences, such as minimum quality levels, favored or disfavored audio channels (e.g., rear vs. front, high, medium, or low frequencies, etc.).

In block 760, the media playback system plays audio in accordance with the configuration of each of the playback devices and corresponding audio signals. In some cases, the media playback system may periodically analyze an acoustic environment and modify playback of devices in and around the acoustic environment. For example, the media playback system may be configured to automatically analyze (possibly in coordination with other devices) an acoustic environment every 15 minutes, 30 minutes, hour, day, week, etc. In some cases, the media playback system may be prompted to analyze an acoustic environment in response to a user input, such as a user pressing a physical button on a device, selecting an "Analyze Acoustics" option in a graphical user interface, etc. In some cases, the media playback system may be prompted to analyze the acoustic environment based on receiving input or otherwise determining that the network on which the media playback system operates is congested. Other examples are also possible.

Although described herein as being managed or performed by a broadly defined media playback system, one of ordinary skill in the art will recognize that the steps of method 700 may be performed by any number of devices and systems. For example, individual playback devices may periodically analyze their acoustic environment in accordance with the systems and methods disclosed herein and modify their playback accordingly. In some cases, these playback devices may share the results of their analysis of the acoustic environment with one or more other devices or systems. As another example, acoustic information collected from any of the devices described herein may be provided to an external system, such as a cloud-based system, for analyzing acoustic environment information which, in turn, can identify opportunities for reducing audio quality and provide corresponding instructions to the media playback system and/or individual playback devices.

FIG. 8 illustrates an example method 800 for analyzing at least a portion of an acoustic environment in accordance with some embodiments of the disclosed technology. In this example, the method may be performed by a computing device in communication with a number of sensors. The computing device may include one or more of playback devices, playback controller devices, and general computing devices in the acoustic environment, or remote from the acoustic environment (e.g. the cloud). One of ordinary skill in the art will recognize other devices and systems may have more or fewer features for analyzing an acoustic environment. For example, a microphone system may only be able to capture and process sound whereas a smart home may have access to much more information (via one or more devices and/or subsystems). As such, methods similar to method 800 performed by other devices and systems may have more or fewer steps for capturing information related to analyzing the acoustic environment.

With reference to FIG. 8, the method 800 begins at block 810, which involves determining the position of the device relative to the acoustic environment based on, for example, infrared technology, wireless signals, microphones, location sensors, a Global Positioning System (GPS), triangulation techniques, and so on.

In block 820, the media playback system analyzes sound levels, acoustic responses, etc. using, for example, a microphone and audio signal processing techniques.

In block 830, the media playback system detects or estimates the location of users in the acoustic environment. For example, the media playback system may use occupancy sensors, measurements of WiFi signals and/or other signals, and/or microphones to determine where users are relative to the acoustic environment.

In block 840, the media playback system collects an acoustic profile based on the collected information, and then method 800 completes. In some cases, blocks 810-840 may be performed concurrently in parallel, sequentially in the order shown or a different order, or some combination thereof. In some cases, the media playback system may share the profile with one or more other devices and/or systems, such as a playback device, a smart home, a cloud-based system for processing information about acoustic environments, and so on.

For the various functions described in reference to method 800, the media playback system may use any techniques, or combinations thereof, for assessing an acoustic environment described in U.S. Pat. No. 9,219,460, entitled "Audio settings based on environment," U.S. Pat. No. 9,763,018, entitled "Calibration of audio playback devices," U.S. Pat. No. 10,459,684, entitled "Calibration of a playback device based on an estimated frequency response," U.S. Pat. No. 10,299,061, entitled "Playback device calibration," and U.S. Pat. No. 10,734,965, entitled "Audio calibration of a portable playback device," each of which is herein incorporated by reference in its entirety.

FIG. 9 illustrates an example method 900 for synthesizing sound in accordance with some embodiments of the disclosed technology. With reference to FIG. 9, the method 900 begins at block 910, which involves receiving an audio signal, such as an audio signal corresponding to a sporting event. In block 920, the media playback system filters audio from the received audio signal, such as the play-by-play, announcer commentary, discernible conversations or outbursts from the crowd, etc. to capture background noise from the audio signal, such as crowd noise from the sporting event. In block 930, the media playback system generates an audio loop from the filtered audio signal of a predetermined length (e.g., 10 seconds, 30 seconds, 240 seconds, etc.). In some cases, the media playback system may further reduce the quality of the loop by downsampling, compressing, or removing additional audio channels from the audio loop data. In block 940, the media playback system transmits the generated loop to one or more playback devices for playback, such as speaker currently playing audio from the sporting event. In block 950, the media playback system transmits volume data to the one or more playback devices so that the one or more playback devices can play the loop at an appropriate volume. In decision block 960, if the volume of the received audio signal has changed, then the media playback system loops back to block 950 to transmit volume data to the one or more playback devices, otherwise the media playback system continues at block 970. For example, if the volume of the crowd at the sporting event increases, the media playback system can send an indication of the increase to the playback devices so that they can increase the volume of the loop. In some cases, the media playback system may generate multiple loops from an audio signal, such as a loop for general crowd noise, a loop for cheering, a loop for jeering, a loop for laughter, and so on. In some cases, a loop generated from one audio signal may be re-used to synthesize sound for another audio signal, such as a set of loops for football games, a set of loops for baseball games, a set of loops for parliamentary debates, and so on so that the media system does not have to send loops for every event, thereby conserving bandwidth and processing resources. In decision block 970, if playback of the audio signal is complete (e.g., if the sporting event has ended or a user has changed the channel), then method 900 completes, otherwise the media playback system loops back to decision block 960 to monitor the volume of the corresponding portion of the audio signal (e.g., the crowd noise).

In the illustrated examples described above, the devices may be shown as audio and/or video playback devices. In some examples, however, one or more of the devices may comprise other types of devices including smartphones, tablets, video display devices (e.g., televisions, projectors), lanterns or flashlights, internet of things (IoT) devices such as sensors, cameras, microphones, thermostats, light sources, smart doorbells, etc.

V. Conclusion

The above discussions relating to wireless power transfer devices, playback devices, controller devices, playback zone configurations, and media/audio content sources provide only some examples of operating environments within which functions and methods described below may be implemented. Other operating environments and configurations of wireless power transfer systems, media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples for convenience. These are provided as examples and do not limit the present technology. It is noted that any of the dependent examples may be combined in any combination, and placed into a respective independent example. The other examples can be presented in a similar manner.

Example 1: A media playback system comprising: a first playback device; and one or more computer-readable media having instructions stored thereon that, when executed by one or more processors, cause the media playback system to perform operations comprising: configuring the first playback device to play one or more content items at a first resolution, monitoring an acoustic environment in which the first playback device is playing the one or more content items, identifying at least one condition of the acoustic environment in which the first playback device is playing the one or more content items, and after identifying the at least one condition, configuring the first playback device to play one or more content items at a second resolution, wherein the second resolution is lower than first resolution.

Example 2: The media playback system of any one of the Examples herein, wherein the identified at least one condition of the acoustic environment in which the first playback device is playing the one or more content items includes a noise level beyond a predefined threshold.

Example 3: The media playback system of any one of the Examples herein, wherein the second resolution is based on the noise level.

Example 4: The media playback system of any one of the Examples herein, wherein the identified at least one condition of the acoustic environment in which the first playback device is playing the one or more content items includes an indication of whether a user is in proximity to the acoustic environment.

Example 5: The media playback system of any one of the Examples herein, wherein configuring the first playback device to play one or more content items at the second resolution includes reducing the dynamic range of audio data associated with the one or more content items.

Example 6: The media playback system of any one of the Examples herein, wherein configuring the first playback device to play one or more content items at the second resolution includes resampling audio data associated with the one or more content items.

Example 7: The media playback system of any one of the Examples herein, wherein the identified at least one condition of the acoustic environment in which the first playback device is playing the one or more content items includes a location of the first playback device relative to the acoustic environment.

Example 8: The media playback system of any one of the Examples herein, wherein configuring the first playback device to play the one or more content items at the first resolution comprises sending stereo content to the first playback device and wherein configuring the first playback device to play the one or more content items at the second resolution comprises sending mono content to the first playback device.

Example 9: The media playback system of any one of the Examples herein, the operations further comprising: receiving, from a user, a selection of one or more audio channels, wherein configuring the first playback device to play one or more content items at the second resolution includes dropping the selected one or more audio channels from playback of the one or more content items.

Example 10: The media playback system of any one of the Examples herein, the operations further comprising: during synchronized playback of a first content item of the one or more content items, sending audio data, at the first resolution, to multiple playback devices, and after identifying the at least one condition, sending audio data, at the second resolution, to the multiple playback devices.

Example 11: A method comprising: configuring the first playback device to play one or more content items at a first resolution, monitoring an acoustic environment in which the first playback device is playing the one or more content items, identifying at least one condition of the acoustic environment in which the first playback device is playing the one or more content items, and after identifying the at least one condition, configuring the first playback device to play one or more content items at a second resolution, wherein the second resolution is lower than first resolution.

Example 12: The method of any one of the Examples herein, wherein the identified at least one condition of the acoustic environment in which the first playback device is playing the one or more content items includes a noise level beyond a predefined threshold.

Example 13: The method of any one of the Examples herein, wherein the second resolution is based on the noise level.

Example 14: The method of any one of the Examples herein, wherein the identified at least one condition of the acoustic environment in which the first playback device is playing the one or more content items includes an indication of whether a user is in proximity to the acoustic environment.

Example 15: The method of any one of the Examples herein, wherein configuring the first playback device to play one or more content items at the second resolution includes reducing the dynamic range of audio data associated with the one or more content items.

Example 16: The method of any one of the Examples herein, wherein configuring the first playback device to play one or more content items at the second resolution includes resampling audio data associated with the one or more content items.

Example 17: v, wherein the identified at least one condition of the acoustic environment in which the first playback device is playing the one or more content items includes a location of the first playback device relative to the acoustic environment.

Example 18: The method of any one of the Examples herein, wherein configuring the first playback device to play the one or more content items at the first resolution comprises sending stereo content to the first playback device and wherein configuring the first playback device to play the one or more content items at the second resolution comprises sending mono content to the first playback device.

Example 19: The method of any one of the Examples herein, further comprising: receiving, from a user, a selection of one or more audio channels, wherein configuring the first playback device to play one or more content items at the second resolution includes dropping the selected one or more audio channels from playback of the one or more content items.

Example 20: The method of any one of the Examples herein, further comprising: during synchronized playback of a first content item of the one or more content items, sending audio data, at the first resolution, to multiple playback devices, and after identifying the at least one condition, sending audio data, at the second resolution, to the multiple playback devices.

Example 21: One or more tangible, non-transitory computer-readable media storing instructions that, when executed by one or more processors of a media playback system, cause the media playback system to perform operations comprising: configuring the first playback device to play one or more content items at a first resolution, monitoring an acoustic environment in which the first playback device is playing the one or more content items, identifying at least one condition of the acoustic environment in which the first playback device is playing the one or more content items, and after identifying the at least one condition, configuring the first playback device to play one or more content items at a second resolution, wherein the second resolution is lower than first resolution.

Example 22: The one or more tangible, non-transitory computer-readable media of any one of the Examples herein, wherein the identified at least one condition of the acoustic environment in which the first playback device is playing the one or more content items includes a noise level beyond a predefined threshold.

Example 23: The one or more tangible, non-transitory computer-readable media of any one of the Examples herein, wherein the second resolution is based on the noise level.

Example 24: The one or more tangible, non-transitory computer-readable media of any one of the Examples herein, wherein the identified at least one condition of the acoustic environment in which the first playback device is playing the one or more content items includes an indication of whether a user is in proximity to the acoustic environment.

Example 25: The one or more tangible, non-transitory computer-readable media of any one of the Examples herein, wherein configuring the first playback device to play one or more content items at the second resolution includes reducing the dynamic range of audio data associated with the one or more content items.

Example 26: The one or more tangible, non-transitory computer-readable media of any one of the Examples herein, wherein configuring the first playback device to play one or more content items at the second resolution includes resampling audio data associated with the one or more content items.

Example 27: The one or more tangible, non-transitory computer-readable media of any one of the Examples herein, wherein the identified at least one condition of the acoustic environment in which the first playback device is playing the one or more content items includes a location of the first playback device relative to the acoustic environment.

Example 28: The one or more tangible, non-transitory computer-readable media of any one of the Examples herein, wherein configuring the first playback device to play the one or more content items at the first resolution comprises sending stereo content to the first playback device and wherein configuring the first playback device to play the one or more content items at the second resolution comprises sending mono content to the first playback device.

Example 29: The one or more tangible, non-transitory computer-readable media of any one of the Examples herein, the operations further comprising: receiving, from a user, a selection of one or more audio channels, wherein configuring the first playback device to play one or more content items at the second resolution includes dropping the selected one or more audio channels from playback of the one or more content items.

Example 30: The one or more tangible, non-transitory computer-readable media of any one of the Examples herein, the operations further comprising: during synchronized playback of a first content item of the one or more content items, sending audio data, at the first resolution, to multiple playback devices, and after identifying the at least one condition, sending audio data, at the second resolution, to the multiple playback devices.

The invention claimed is:

1. A media playback system comprising:

a first playback device; and one or more computer-readable media having instructions stored thereon that, when executed by one or more processors, cause the media playback system to perform operations comprising:

configuring the first playback device to play one or more content items at a first resolution, monitoring an acoustic environment in which the first playback device is playing the one or more content items, identifying at least one condition of the acoustic environment in which the first playback device is playing the one or more content items, receiving from a user, a selection of one or more audio channels; and after identifying the at least one condition, configuring the first playback device to play the one or more content items at a second resolution, wherein the second resolution is lower than the first resolution and wherein configuring the first playback device to play the one or more content items at the second resolution includes dropping the selected one or more audio channels from playback of the one or more content items.

2. The media playback system of claim 1, wherein the identified at least one condition of the acoustic environment in which the first playback device is playing the one or more content items includes a noise level beyond a predefined threshold.

3. The media playback system of claim 2, wherein the second resolution is based on the noise level.

4. The media playback system of claim 2, the operations further comprising:

determining a difference between the noise level and the predefined threshold, wherein the second resolution is based on the determined difference, wherein the first resolution is associated with a first bit depth, wherein the second resolution is associated with a second bit depth, and wherein the second bit depth is lower than the first bit depth.

5. The media playback system of claim 1, wherein the identified at least one condition of the acoustic environment in which the first playback device is playing the one or more content items includes an indication of whether a user is in proximity to the acoustic environment.

6. The media playback system of claim 1, wherein configuring the first playback device to play one or more content items at the second resolution includes reducing the dynamic range of audio data associated with the one or more content items.

7. The media playback system of claim 1, wherein configuring the first playback device to play one or more content items at the second resolution includes resampling audio data associated with the one or more content items.

8. The media playback system of claim 1, wherein the identified at least one condition of the acoustic environment in which the first playback device is playing the one or more content items includes a location of the first playback device relative to the acoustic environment.

9. The media playback system of claim 1, wherein configuring the first playback device to play the one or more content items at the first resolution comprises sending stereo content to the first playback device and wherein configuring the first playback device to play the one or more content items at the second resolution comprises sending mono content to the first playback device.

10. The media playback system of claim 1, the operations further comprising:

during synchronized playback of a first content item of the one or more content items, sending audio data, at the first resolution, to multiple playback devices, and after identifying the at least one condition, sending audio data, at the second resolution, to the multiple playback devices.

11. A method comprising:

configuring a first playback device to play one or more content items at a first resolution, monitoring an acoustic environment in which the first playback device is playing the one or more content items, identifying at least one condition of the acoustic environment in which the first playback device is playing the one or more content items, receiving, from a user a selection of one or more audio channels; and after identifying the at least one condition, configuring the first playback device to play the one or more content items at a second resolution, wherein the second resolution is lower than the first resolution and wherein configuring the first playback device to play the one or more content items at the second resolution includes dropping the selected one or more audio channels from playback of the one or more content items.

12. The method of claim 11, wherein the identified at least one condition of the acoustic environment in which the first playback device is playing the one or more content items includes a noise level beyond a predefined threshold.

13. The method of claim 12, wherein the second resolution is based on the noise level.

14. The method of claim 11, wherein the identified at least one condition of the acoustic environment in which the first playback device is playing the one or more content items includes an indication of whether a user is in proximity to the acoustic environment.

15. The method of claim 11, wherein configuring the first playback device to play one or more content items at the second resolution includes reducing the dynamic range of audio data associated with the one or more content items.

16. One or more tangible, non-transitory computer-readable media storing instructions that, when executed by one or more processors of a media playback system, cause the media playback system to perform operations comprising:

configuring a first playback device to play one or more content items at a first resolution, monitoring an acoustic environment in which the first playback device is playing the one or more content items, identifying at least one condition of the acoustic environment in which the first playback device is playing the one or more content items, and after identifying the at least one condition, configuring the first playback device to play the one or more content items at a second resolution, wherein the second resolution is lower than the first resolution and wherein configuring the first playback device to play the one or more content items at the second resolution includes dropping one or more audio channels from playback of the one or more content items.

17. The one or more tangible, non-transitory computer-readable media of claim 16, wherein the identified at least one condition of the acoustic environment in which the first playback device is playing the one or more content items includes a noise level beyond a predefined threshold.

18. The one or more tangible, non-transitory computer-readable media of claim 17, wherein the second resolution is based on the noise level.

19. The one or more tangible, non-transitory computer-readable media of claim 16, wherein the identified at least one condition of the acoustic environment in which the first playback device is playing the one or more content items includes an indication of whether a user is in proximity to the acoustic environment.

20. The one or more tangible, non-transitory computer-readable media of claim 16, wherein configuring the first playback device to play one or more content items at the second resolution includes reducing the dynamic range of audio data associated with the one or more content items.

* * * * *